(12) United States Patent
Wu et al.

(10) Patent No.: US 7,495,938 B2
(45) Date of Patent: Feb. 24, 2009

(54) DC VOLTAGE BALANCE CONTROL FOR THREE-LEVEL NPC POWER CONVERTERS WITH EVEN-ORDER HARMONIC ELIMINATION SCHEME

(75) Inventors: Bin Wu, Toronto (CA); Steven C. Rizzo, Cambridge (CA); Navid R. Zargari, Cambridge (CA); Congwei Liu, Toronto (CA); Weixing Feng, Hamilton (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 61 days.

(21) Appl. No.: 11/354,597

(22) Filed: Feb. 14, 2006

(65) Prior Publication Data

US 2006/0245216 A1 Nov. 2, 2006

Related U.S. Application Data

(60) Provisional application No. 60/671,714, filed on Apr. 15, 2005.

(51) Int. Cl.
  *H02M 1/12* (2006.01)
  *H02M 7/521* (2006.01)
(52) U.S. Cl. .............................. 363/40; 363/97; 363/172
(58) Field of Classification Search ............. 363/15–17, 363/34, 37, 39–41, 46–47, 95, 97–98, 131–134, 363/142, 137
See application file for complete search history.

(56) References Cited

U.S. PATENT DOCUMENTS

| 5,355,297 | A | | 10/1994 | Kawabata et al. |
| 5,361,196 | A | | 11/1994 | Tanamachi et al. |
| 5,506,765 | A | | 4/1996 | Nakata et al. |
| 5,627,742 | A | | 5/1997 | Nakata et al. |
| 5,644,483 | A | * | 7/1997 | Peng et al. ..................... 363/37 |
| 5,910,892 | A | * | 6/1999 | Lyons et al. ................... 363/98 |
| 5,969,498 | A | * | 10/1999 | Cooke ......................... 318/799 |
| 6,031,738 | A | * | 2/2000 | Lipo et al. ..................... 363/37 |
| 6,058,031 | A | * | 5/2000 | Lyons et al. ................... 363/67 |
| 6,154,378 | A | * | 11/2000 | Peterson et al. ............... 363/37 |
| 6,166,929 | A | | 12/2000 | Ma et al. |

(Continued)

OTHER PUBLICATIONS

New Variable Speed Drive with Proven Motor Friendly Performance for Medium Voltage Motors, Juergen K. Steinke and Risto Vuolle, Herbert Prenner, Jukka Jarvinen.

(Continued)

*Primary Examiner*—Shawn Riley
(74) *Attorney, Agent, or Firm*—Fay Sharpe LLP; Alexander R. Kuszewski

(57) ABSTRACT

Three-level inverter and rectifier power conversion systems and space vector modulation (SVM) controls having even-order harmonic elimination for neutral voltage balancing with a predefined vector switching sequences for half-wave symmetry in open loop system operation. The vector sequence listings for each SVM diagram segment includes switching state entries individually indicating one of three possible switching state levels positive (P), zero (0), or negative (N) for each of three or more switching groups of the power conversion system, with listings for each pair of first and second diametrically opposite diagram segments include symmetrically opposite switching states, with positive levels in the entries of the listing for the first segment corresponding to negative levels in the entries of the listing for the second segment and vice versa.

19 Claims, 15 Drawing Sheets

U.S. PATENT DOCUMENTS

| | | | |
|---|---|---|---|
| 6,288,921 | B1 | 9/2001 | Uchino et al. |
| 6,333,569 | B1 | 12/2001 | Kim |
| 6,366,483 | B1 | 4/2002 | Ma et al. |
| 6,534,949 | B2 | 3/2003 | Szczesny et al. |
| 6,617,814 | B1 | 9/2003 | Wu et al. |
| 6,842,354 | B1* | 1/2005 | Tallam et al. ............... 363/98 |
| 2006/0192520 | A1 | 8/2006 | Yin et al. |
| 2006/0192522 | A1 | 8/2006 | Kerkman et al. |
| 2006/0197491 | A1* | 9/2006 | Nojima ..................... 318/801 |

OTHER PUBLICATIONS

New Feedforward Space-Vector PWM Method to Obtain Balanced AC Output Voltages in a Three-Level Neutral-Point-Clamped Converter, Josep Pou, Dushan Boroyevich, Rafael Pindado, IEE Transactions on Industrial Electronics, vol. 49, No. 5, Oct. 2002.

Effects of Nonsinusoidal Voltage on the Operation Performance of a Three-Phase Induction Motor, Ching-Yin Lee, Wei-Jen Lee, IEEE Transactions on Energy Conversion, vol. 14, No. 2, Jun. 1999.

IEE Recommended Practices and Requirements for Harmonic Control in Electrical Power Systems, published by the Institute of Electrical and Electronic Engineers, Inc., New York, NY.

A Novel Space Vector Control of Three-Level PWM Converter, Lixiang Wei, Yuliang Wu, Chongjian Li, Huiqing Wang, Shixiang Liu Fahai Li, IEEE 1999 International Conference of Power Electronics and Drive Systems, PEDS'99, Jul. 1999, Hong Kong.

Comparison of RPWM and PWM Space Vector Switching Schemes for 3-Level Power Inverters, Y. Shrivastava, C.K. Lee, S.Y.R. Hui and H.S.H. Chung, Department of Electronic Engineering , City University of Hong Kong, with the University of Sydney , Australia.

A Neutral-Network-Based Space-Vector PWM Controller for a Three-Level Voltage-Fed Inverter Induction Motor Drive, Subrata K. Mondal, Joao O. P. Pinto, Bimal K. Bose, IEEE Transactions on Industry Applications, vol. 38, No. 3, May/Jun. 2002.

Tadros, Y.: Salama, S.; Hof, R., "Three-level TGBT inverter", Power Electronics Specialists Conference, 1992 PESC '92 Record, 23rd Annual IEEE Jun. 29-Jul. 3, 1992, pp. 46-52 vol. 1.

Du Toit Mouton, II., "Natural Balancing of Three-Level Neutral-point Clamped PWM Inverters", IEEE Transactions on, Industrial Electronics, V49, 15, pp. 1017-1025, 2002.

Alonso, O.; Marroyo, L.; Sanchis, P.; Gubia, E.; Guerrero, A., "Analysis of Neutral-Point Voltage Balancing Problem in Three-Level Neutral-Point Clamped Inverters with SVPWM Modulation", IEEE IEcon'02, V2, pp. 920-925, 2002.

Pou, J.; Boroyevich, D.; Pindado, R., "Effects of Imbalances and Nonlinear Loads on the Voltage Balance of a Neutra-Point-Clamped Inverter", Power Electronics, IEEE Transactions on vol. 20, Issue 1, Jan. 2005 pp. 123-131.

Celanovic, N.; Boroyevich, D., "A Comprehensive Study of Neutral-Point Voltage Balancing Problem in a Three-Level Neutral-Point Clamped Voltage Source PWM Inverters", IEEE Transactions on, Power Electronics, V15, 12, pp. 242-249, 2000.

Sun-Kyoung Lim; Jun-Iia Kim; Kwanghee Nam, "A DC-Link Voltage Balancing Algorithm for 3-Level Converter Using the Zero Sequence Current" Power Electronics Specialist Conference, 1999. PESC 99. 30th Annual IEEE vol. 2, Jun. 27-Jul. 1, 1999 pp. 1083-1088 vol. 2.

Shinohara, K.; Sakasegawa, E., "A New PWM Method with Suppressed Neutral Point Potential Variation of Three Level Inverter for AC Servo Motor Drive", Power Electronics and Drive Systems, 1999. PEDS 99. Proceedings of the IEEE 1999 International Conference on vol. 2, Jul. 27-29, 1999 pp. 668-672 vol. 2.

Tae Hyeong Seo Chang Ho Choi, Compensation for the Neutral-Point Potential Variation in Three-Level Space Vector PWM, APAE 2001, vol. 2, on pp. 1135-1140 vol. 2.

Holtz, J.; Springob, L., "Reduce Harmonics PWM Controlled Line-Side Converter for Electric Drives", Industry Applications, IEEE Transactions on vol. 29, Issue 4, Jul.-Aug. 1993 pp. 814-819.

Liu, H.L.; Cho, G.H., "Three-Level Space vector PWM in Low Index Modulation Region Avoiding Narrow Pulse Problem", Power Electronics, IEEE Transactions on vol. 9, Issue 5, Sep. 1994 pp. 481-486.

Seixas, P.F.; Severo Mendes, M.A.; Donoso-Garcia, P.; Lima, A.M. N., "A Space Vector PWM Method for Three-Level Voltage Source Inverters", Applied Power Electronics Conference and Exposition, 2000. APEC 2000. Fifteenth Annual IEEE vol. 1, Feb. 6-10, 2000 pp. 549-555 vol. 1.

Fei Wang, "Sin-Triangle Versus Space-Vector Modulation for Three-Level PWM Voltage-Source Inverters", Industry Applications, IEEE Transactions on vol. 38, Issue 2, Mar.-Apr. 2002 pp. 500-506.

Quiang Song; Wenhua Liu; Qingguang Yu; Xiaorong Xie; Zhonghong Wang, "A Neutral-Point Potential Balancing Algorithm for Three-Level NPC Inverters Using Analytically Injected Zero-Sequence Voltage", Applied Power Electronics Conference and Exposition, 2003. APEC 03. Eighteenth Annual IEEE vol. 1, Feb. 9-13, 2003 pp. 228-233 vol. 1.

Koyama, M.; Fujii, t.; Uchida, R.; Kawabata, T., "Space Voltage Vector-Based New PWM Method for Large Capacity Three-Level GTO Inverter", Industrial Electronics, Control, Instrumentation, and Automation, 1992. "Power Electronics and Motion Control"., Proceedings of the 1992 International Conference on Nov. 9-13, 1992 pp. 271-276 vol. 1.

Tamai, S.; Koyama, M.; Fujii, T,; Mizoguchi, S.; Kawabata, t., "3 Level GTO Converter-Inverter Pair System for Large Capacity Induction Motor Drive", Power Electronics and Applications, 1993., Fifth European Conference on Sep. 13-16, 1993 pp. 45-50 vol. 5.

Lyons, J.P.; Vlalkovic, V.; Espelage, P.M.; Boeltner, F.H.; Larsen, E., "Innovation IGCT main drives", Industry Applications Conference, 1999. Thirty Fourth IAS Annual Meeting. Conference Record of the 1999 IEEEE vol. 4, Oct. 3-7, 1999 pp. 2655-2661 vol. 4.

Yo-Han Lee; Bum-Scok Suh; Chang-Ho Choi; Dong-Seok Hyun, "A New Neutral Point Current Control for a 3-Level Converter/Inverter Pair System", Industry Applications Conference, 1999. Thirty-Fourth IAS Annual Meeting. Conference Record of the 1999 IEEE vol. 3, Oct. 3-7, 1999 pp. 1528-1534 vol. 3.

Dongshcng Zhou; Rouaud, D.G., "Experimental Comparisons of Space Vector Neutral Point Balancing Strategies for Three-Level Topology", Power Electronis, IEEE Transactions o vol. 16, Issue 6, Nov. 2001 pp. 872-879.

Rodriguez, J.; Pontt, J.; Alzamora, G.; Becker, N.;Einenkel, O.; Weinstein, A., "Novel 20-MW Downhill Conveyor System Using Three-Level converters", Industrial Electronis, IEEE Transactions on vol. 49, Issue 5, Oct. 2002 pp. 1093-1100.

Ogasawara, S.; Akagi, H., "Analysis of Variation of Neutral Point Potential in Neutral-Point Clamped Voltage Source PWM Inverters", Industry Applications Society Annual Meeting, 1993, Conference Record of the 1993 IEEE Oct. 2-8, 1993 pp. 965-970 vol. 2.

DSP Based Space Vector PWM for Three-Level Inverter With DC-Link VoltageVoltage Balancing, Hyo L. Liu, Nam S. Choi and Gyu H. Cho.

Switching Loss Minimized Space Vector PWM Method for IGBT Three-Level Inverter, B. Kaku, I. Miyashita, S. Sone, IEEE Proc.-Electr. Power Appl., vol. 144, No. 3, May 1997.

A Neutral-Point—Clamped PWM Inverter, Akira Nabae, Isao Takahashi, Hirofumi Akagi, IEEE Transactions on Industry Applications, vol. 1A-17, No. 5, Sep./Oct. 1981.

ACS 1000-World's First Standard AC Drive for Medium-voltage Applications, Sohail Malik, Dieter Kluge, ABB Review Feb. 1998.

Slien, J.; Butterworth,, N., Analysis and Design of a Three-Level PWM converter System for Railway-traction Applications', Electric Power Applications, IEEE Proceedings-vol. 144, Issue 5, Sep. 1997 pp. 357-371.

Pou, J.; Pindado, R.; Boroyevich, D.; Rodriguez, P., "Limits of the Neutral-Point Balance in Back-to-Back-Connected Three-Level Converters", Power Electronics, IEEE Transactions on vol. 19, Issue 3, May 2004 pp. 722-731.

Kang, D.W.; Ma, C.S.; Kim, T.J.; Hyun, D.S. Simple Control Strategy for Balancing the DC-Link Voltage of Neutral-Point-Clamped Inverter at Low Modulation Index, Electric Power Applications, IEEE Proceedings-vol. 151, Issue 5, Sep. 9, 2004 pp. 569-575.

Shengming Li and Longya Xu, Fault-Tolerant Operation of a 150 KW 3-Level Neutral-Point Clamped PWM Inverter in a Flywheel Energy Storage System, Industry Applications Conference, 2001 IEEE vol. 1, Sep. 30-Oct. 4, 2001 pp. 585-588 vol. 1.

Marchesoni, M., Segarich,P.; Soressi, E. A New Control Strategy for Neutral-Point-Clamped Active Rectifiers, Industrial Electronics, IEEE Transactions on vol. 52, Issue 2, Apr. 2005 pp. 462-470.

Miyazaki, H,; Fukumoto, H.; Sugiyama, S.; Tachikawa, M.; Azusawa, N. Neutral-Point-clamped Inverter with Parallel Driving of IGBTs for Industrial Applications, Industry Applications, IEEE Transactions on vol. 36, Issue 1, Jan.-Feb. 2000 pp. 146-151.

Ogasawara, S.; Akagi, K. A Vector Control System Using a Neutral-Point-clamped Voltage Source PWM Inverter, Industry Applications Society Annual Meeting, 1991., Conference Record of the 1991 IEEE Sep. 28-Oct. 4, 1991 pp. 422-427 vol. 1.

Rojas, R.; Ohnishi, T.; Suzuki, T. Neutral-Point-Clamped Inverter with Improved Voltage Waveform and Control Range, Industrial Electronics, Control, and Instrumentation, 1993. Proceedings of the IECON '93., International Conference on Nov. 15-19, 1993 pp. 1240-1245 vol. 2.

* cited by examiner

148a

| Segment | Ta | Tb | Tc |
|---|---|---|---|
| 1a 1b | $T_s[2m_a \sin((\pi/3)-\theta)]$ | $T_s[1 - 2m_a \sin((\pi/3) + \theta)]$ | $T_s[2m_a \sin\theta]$ |
| 2a 2b | $T_s[1 - 2m_a \sin\theta]$ | $T_s[2m_a \sin((\pi/3) + \theta) - 1]$ | $T_s[1-2m_a \sin((\pi/3) - \theta)]$ |
| 3 | $T_s[2 - 2m_a \sin((\pi/3) + \theta)]$ | $T_s[2m_a \sin\theta]$ | $T_s[2m_a \sin((\pi/3) - \theta) - 1]$ |
| 4 | $T_s[2m_a \sin\theta-1]$ | $T_s[2m_a \sin((\pi/3) - \theta)]$ | $T_s[2 - 2m_a \sin((\pi/3) + \theta)]$ |

| State Entry | 1 | 2 | 3 | 4 | 5 | 6 | 7 |
|---|---|---|---|---|---|---|---|
| Vector | $V_{1P}$ | $V_7$ | $V_{2N}$ | $V_{1N}$ | $V_{2N}$ | $V_7$ | $V_{1P}$ |
| Switching State | P00 | PON | 00N | 0NN | 00N | PON | P00 |
| Dwell Time | Ta/4 | Tb/2 | Tc/2 | Ta/2 | Tc/2 | Tb/2 | Ta/4 |

FIG. 1E 140
146

SVM EHE VECTOR SWITCHING SEQUENCE

SECTOR 1

| 1-1a | | 1-1b | | 1-2a | | 1-2b | | 1-3 | | 1-4 | |
|---|---|---|---|---|---|---|---|---|---|---|---|
| $V_{1P}$ | P00 | $V_{2N}$ | 00N | $V_{1P}$ | P00 | $V_{2N}$ | 00N | $V_{1P}$ | P00 | $V_{2N}$ | 00N |
| $V_0$ | 000 | $V_0$ | 000 | $V_7$ | P0N | $V_7$ | P0N | $V_7$ | P0N | $V_7$ | P0N |
| $V_{2N}$ | 00N | $V_{1P}$ | P00 | $V_{2N}$ | 00N | $V_{1P}$ | P00 | $V_{13}$ | PNN | $V_{14}$ | PPN |
| $V_{1N}$ | 0NN | $V_{2P}$ | PP0 | $V_{1N}$ | 0NN | $V_{2P}$ | PP0 | $V_{1N}$ | 0NN | $V_{2P}$ | PP0 |
| $V_{2N}$ | 00N | $V_{1P}$ | P00 | $V_{2N}$ | 00N | $V_{1P}$ | P00 | $V_{13}$ | PNN | $V_{14}$ | PPN |
| $V_0$ | 000 | $V_0$ | 000 | $V_7$ | P0N | $V_7$ | P0N | $V_7$ | P0N | $V_7$ | P0N |
| $V_{1P}$ | P00 | $V_{2N}$ | 00N | $V_{1P}$ | P00 | $V_{2N}$ | 00N | $V_{1P}$ | P00 | $V_{2N}$ | 00N |

SECTOR 2

| 2-1a | | 2-1b | | 2-2a | | 2-2b | | 2-3 | | 2-4 | |
|---|---|---|---|---|---|---|---|---|---|---|---|
| $V_{2N}$ | 00N | $V_{3P}$ | 0P0 | $V_{2N}$ | 00N | $V_{3P}$ | 0P0 | $V_{2N}$ | 00N | $V_{3P}$ | 0P0 |
| $V_0$ | 000 | $V_0$ | 000 | $V_8$ | 0PN | $V_8$ | 0PN | $V_8$ | 0PN | $V_8$ | 0PN |
| $V_{3P}$ | 0P0 | $V_{2N}$ | 00N | $V_{3P}$ | 0P0 | $V_{2N}$ | 00N | $V_{14}$ | PPN | $V_{15}$ | NPN |
| $V_{2P}$ | PP0 | $V_{3N}$ | N0N | $V_{2P}$ | PP0 | $V_{3N}$ | N0N | $V_{2P}$ | PP0 | $V_{3N}$ | N0N |
| $V_{3P}$ | 0P0 | $V_{2N}$ | 00N | $V_{3P}$ | 0P0 | $V_{2N}$ | 00N | $V_{14}$ | PPN | $V_{15}$ | NPN |
| $V_0$ | 000 | $V_0$ | 000 | $V_8$ | 0PN | $V_8$ | 0PN | $V_8$ | 0PN | $V_8$ | 0PN |
| $V_{2N}$ | 00N | $V_{3P}$ | 0P0 | $V_{2N}$ | 00N | $V_{3P}$ | 0P0 | $V_{2N}$ | 00N | $V_{3P}$ | 0P0 |

SECTOR 3

| 3-1a | | 3-1b | | 3-2a | | 3-2b | | 3-3 | | 3-4 | |
|---|---|---|---|---|---|---|---|---|---|---|---|
| $V_{3P}$ | 0P0 | $V_{4N}$ | N00 | $V_{3P}$ | 0P0 | $V_{4N}$ | N00 | $V_{3P}$ | 0P0 | $V_{4N}$ | N00 |
| $V_0$ | 000 | $V_0$ | 000 | $V_9$ | NP0 | $V_9$ | NP0 | $V_9$ | NP0 | $V_9$ | NP0 |
| $V_{4N}$ | N00 | $V_{3P}$ | 0P0 | $V_{4N}$ | N00 | $V_{3P}$ | 0P0 | $V_{15}$ | NPN | $V_{16}$ | NPP |
| $V_{3N}$ | N0N | $V_{4P}$ | 0PP | $V_{3N}$ | N0N | $V_{4P}$ | 0PP | $V_{3N}$ | N0N | $V_{4P}$ | 0PP |
| $V_{4N}$ | N00 | $V_{3P}$ | 0P0 | $V_{4N}$ | N00 | $V_{3P}$ | 0P0 | $V_{15}$ | NPN | $V_{16}$ | NPP |
| $V_0$ | 000 | $V_0$ | 000 | $V_9$ | NP0 | $V_9$ | NP0 | $V_9$ | NP0 | $V_9$ | NP0 |
| $V_{3P}$ | 0P0 | $V_{4N}$ | N00 | $V_{3P}$ | 0P0 | $V_{4N}$ | N00 | $V_{3P}$ | 0P0 | $V_{4N}$ | N00 |

SVM EHE VECTOR SWITCHING SEQUENCE

⋮

SECTOR 4

| 4-1a | | 4-1b | | 4-2a | | 4-2b | | 4-3 | | 4-4 | |
|---|---|---|---|---|---|---|---|---|---|---|---|
| $V_{4N}$ | N00 | $V_{5P}$ | 00P | $V_{4N}$ | N00 | $V_{5P}$ | 00P | $V_{4N}$ | N00 | $V_{5P}$ | 00P |
| $V_0$ | 000 | $V_0$ | 000 | $V_{10}$ | N0P | $V_{10}$ | N0P | $V_{10}$ | N0P | $V_{10}$ | N0P |
| $V_{5P}$ | 00P | $V_{4N}$ | N00 | $V_{5P}$ | 00P | $V_{4N}$ | N00 | $V_{16}$ | NPP | $V_{17}$ | NNP |
| $V_{4P}$ | 0PP | $V_{5N}$ | NN0 | $V_{4P}$ | 0PP | $V_{5N}$ | NN0 | $V_{4P}$ | 0PP | $V_{5N}$ | NN0 |
| $V_{5P}$ | 00P | $V_{4N}$ | N00 | $V_{5P}$ | 00P | $V_{4N}$ | N00 | $V_{16}$ | NPP | $V_{17}$ | NNP |
| $V_0$ | 000 | $V_0$ | 000 | $V_{10}$ | N0P | $V_{10}$ | N0P | $V_{10}$ | N0P | $V_{10}$ | N0P |
| $V_{4N}$ | N00 | $V_{5P}$ | 00P | $V_{4N}$ | N00 | $V_{5P}$ | 00P | $V_{4N}$ | N00 | $V_{5P}$ | 00P |

SECTOR 5

| 5-1a | | 5-1b | | 5-2a | | 5-2b | | 5-3 | | 5-4 | |
|---|---|---|---|---|---|---|---|---|---|---|---|
| $V_{5P}$ | 00P | $V_{6N}$ | 0N0 | $V_{5P}$ | 00P | $V_{6N}$ | 0N0 | $V_{5P}$ | 00P | $V_{6N}$ | 0N0 |
| $V_0$ | 000 | $V_0$ | 000 | $V_{11}$ | 0NP | $V_{11}$ | 0NP | $V_{11}$ | 0NP | $V_{11}$ | 0NP |
| $V_{6N}$ | 0N0 | $V_{5P}$ | 00P | $V_{6N}$ | 0N0 | $V_{5P}$ | 00P | $V_{17}$ | NNP | $V_{18}$ | PNP |
| $V_{5N}$ | NN0 | $V_{6P}$ | P0P | $V_{5N}$ | NN0 | $V_{6P}$ | P0P | $V_{5N}$ | NN0 | $V_{6P}$ | P0P |
| $V_{6N}$ | 0N0 | $V_{5P}$ | 00P | $V_{6N}$ | 0N0 | $V_{5P}$ | 00P | $V_{17}$ | NNP | $V_{18}$ | PNP |
| $V_0$ | 000 | $V_0$ | 000 | $V_{11}$ | 0NP | $V_{11}$ | 0NP | $V_{11}$ | 0NP | $V_{11}$ | 0NP |
| $V_{5P}$ | 00P | $V_{6N}$ | 0N0 | $V_{5P}$ | 00P | $V_{6N}$ | 0N0 | $V_{5P}$ | 00P | $V_{6N}$ | 0N0 |

SECTOR 6

| 6-1a | | 6-1b | | 6-2a | | 6-2b | | 6-3 | | 6-4 | |
|---|---|---|---|---|---|---|---|---|---|---|---|
| $V_{6N}$ | 0N0 | $V_{1P}$ | P00 | $V_{6N}$ | 0N0 | $V_{1P}$ | P00 | $V_{6N}$ | 0N0 | $V_{1P}$ | P00 |
| $V_0$ | 000 | $V_0$ | 000 | $V_{12}$ | PN0 | $V_{12}$ | PN0 | $V_{12}$ | PN0 | $V_{12}$ | PN0 |
| $V_{1P}$ | P00 | $V_{6N}$ | 0N0 | $V_{1P}$ | P00 | $V_{6N}$ | 0N0 | $V_{18}$ | PNP | $V_{13}$ | PNN |
| $V_{6P}$ | P0P | $V_{1N}$ | 0NN | $V_{6P}$ | P0P | $V_{1N}$ | 0NN | $V_{6P}$ | P0P | $V_{1N}$ | 0NN |
| $V_{1P}$ | P00 | $V_{6N}$ | 0N0 | $V_{1P}$ | P00 | $V_{6N}$ | 0N0 | $V_{18}$ | PNP | $V_{13}$ | PNN |
| $V_0$ | 000 | $V_0$ | 000 | $V_{12}$ | PN0 | $V_{12}$ | PN0 | $V_{12}$ | PN0 | $V_{12}$ | PN0 |
| $V_{6N}$ | 0N0 | $V_{1P}$ | P00 | $V_{6N}$ | 0N0 | $V_{1P}$ | P00 | $V_{6N}$ | 0N0 | $V_{1P}$ | P00 |

FIG. 2B

DC VOLTAGE BALANCE CONTROL FOR THREE-LEVEL NPC POWER CONVERTERS WITH EVEN-ORDER HARMONIC ELIMINATION SCHEME

REFERENCE TO RELATED APPLICATION

This application claims priority to and the benefit of U.S. Provisional Patent Application Ser. No. 60/671,714, filed Apr. 15, 2005, entitled DC VOLTAGE BALANCE CONTROL FOR THREE-LEVEL NPC INVERTER WITH SELECTIVE HARMONIC ELIMINATION SCHEME, the entirety of which is hereby incorporated by reference.

FIELD OF THE INVENTION

The present invention relates generally to electrical power conversion, and more particularly to controls and methods for pulse width modulated operation of three-level inverter and rectifier type power converters.

BACKGROUND OF THE INVENTION

Power converters have been extensively employed in medium voltage motor drives and other applications in which electrical power needs to be converted from DC to AC or vice versa. Such conversion apparatus is commonly referred to as an inverter for converting DC to AC, or alternatively as a rectifier if the conversion is from AC to DC power, where the AC power connection typically provides a multi-phase output or input, respectively. Multi-phase converters are often constructed using an array of high-voltage, high-speed switches, such as gate-turnoff thyristors (GTOs), insulated-gate bipolar transistors (IGBTs) or other semiconductor-based switching devices, which are selectively actuated through pulse width modulation (PWM) to couple the AC connections with one or the other of the DC bus terminals, where the timing of the array switching determines the power conversion performance. In medium voltage motor drive applications, the timed control of the switch activations in advanced inverter type power converters is used to provide variable frequency, variable amplitude multi-phase AC output power from an input DC bus, whereby driven motors can be controlled across wide voltage and speed ranges.

Neutral point clamped (NPC) converters include two similarly sized high voltage capacitors connected in series between the DC bus lines, with the capacitors being connected to one another at a converter "neutral" point node. In these NPC converters, three-level switching control is often used to provide three switching states for each AC terminal, with the AC terminal being selectively coupled to either of the DC terminals or to the neutral node. Three-level switching techniques allow higher operating voltages along with better (e.g., lower) total harmonic distortion (THD) and electromagnetic interference (EMI) than do comparable two-level inverter designs. Several PWM switching techniques have been used in high or medium voltage NPC power converters to control the switch array, wherein space vector modulation (SVM) approaches are increasingly used because of good harmonic profile, effective neutral point potential control, and ease of digital implementation. In NPC power converters, it is desirable to maintain the neutral voltage at a constant level with the two capacitor voltages being substantially equal, a goal known as neutral point balancing. Problems may arise if the voltage at the NPC inverter neutral point deviates from the mid-point of the DC bus, including stresses to components of the converter itself and/or to devices being powered by the converter, as well as adding harmonic distortion to the output of the inverter. To control the neutral point voltage, many converters are equipped with feedback control apparatus. However, such closed loop neutral balancing approaches are costly, requiring feedback sensing apparatus and advanced control algorithms to regulate the neutral voltage while also providing the desired AC output waveforms. In addition to neutral point balancing, it is desirable to minimize the operating frequencies of the array switches. These problems are of course balanced against frequency, amplitude, and other performance and control requirements for a given converter application. Thus, there remains a continuing need for improved three-level power converters as well as SVM methods and control systems for operating power converters for use in medium voltage motor drives and other applications requiring electrical power conversion.

SUMMARY OF INVENTION

One or more aspects of the invention are now summarized to facilitate a basic understanding of the invention, wherein this summary is not an extensive overview of the invention, and is intended neither to identify certain elements of the invention, nor to delineate the scope thereof. The primary purpose of the summary, rather, is to present some concepts of the invention in a simplified form prior to the more detailed description that is presented hereinafter. The present invention is related to PWM control of three-level power converters, in which space vector modulation (SVM) is used to control the converter switches. Three-level NPC converters and control systems are provided, along with methods for providing three-level switching control signals to balance the neutral point voltage by space vector modulation in open-loop fashion without the added cost, size, and weight of feedback neutral balancing control components. The invention may be advantageously implemented in rectifier and/or inverter applications in order to facilitate cost effective high or medium voltage power conversion with neutral point voltage balancing, low THD and EMI, and the other performance advantages of three-level SVM converters.

In accordance with one or more aspects of the invention, a three-level SVM NPC power conversion system is provided, which can be an inverter for DC-to-AC conversion or a rectifier for converting AC power to DC. The system includes a DC connection, a multi-phase AC connection, and a three-level switching network coupled therewith, along with a control system providing SVM switching control signals to balance the neutral voltage in open-loop fashion. The DC connection has first and second terminals for receiving or supplying DC power, as well as first and second capacitors coupled in series between the DC terminals, where the capacitors are coupled at a common node or neutral point. The AC connection supplies or receives multi-phase electrical power via three or more AC terminals, where the switching network comprises sets of switching devices associated with the AC phase terminals. The switches are actuated by switching control signals from the control system to selectively couple the AC terminals to one of the DC terminals or to the neutral common node, where the control system provides the sets of switching control signals by space vector modulation so as to equalize the voltages across the capacitors in open-loop fashion during operation of the power conversion system. In one implementation, the control system has a space vector modulation system to provide the switching control signals according to an even-order harmonic elimination (EHE) vector switching sequence providing half-wave symmetry to balance the voltage at the common node, with the vector switching sequence defining a sequence of switching states for each segment of an SVM diagram where vector switching sequences for diametrically opposite diagram segments provide symmetrically opposite coupling of the AC terminals with the DC terminals.

Further aspects of the invention relate to a space vector modulation control system for providing switching control signals to a three-level power conversion system. The control system includes drivers for selective actuation of the converter switches, as well as switch control means that controls the drivers by space vector modulation to balance the voltages across the converter capacitors in open-loop operation. In one embodiment, the switch control means comprises an even-order harmonic elimination vector switching sequence, and processing means for controlling the drivers according to a voltage reference vector and according to the vector switching sequence.

Still other aspects of the invention provide a vector switching sequence for space vector modulation of the switching network in a three-level power conversion system. The vector switching sequence is comprised of a machine readable medium including vector sequence listings for each segment of a space vector modulation diagram defining stationary space vectors representing switching states for the switching network and defining a plurality of sectors positioned around an origin of the space vector modulation diagram. The individual sectors have a plurality of triangular segments (e.g., 6 in one example), with each segment being defined by a unique set of three space vectors at the corners of the triangle, where the individual vector sequence listings define a sequence of switching states corresponding to the three space vectors defining each segment, with the vector switching sequences defined for diagram segments that are symmetrically opposite with respect to the diagram origin including symmetrically opposite switching states.

Further aspects of the invention relate to a method for space vector modulation control of a three-level power conversion system. The method comprises providing a space vector modulation vector switching sequence that includes vector sequence listings for each segment of the space vector modulation diagram, with the individual vector sequence listings defining a sequence of switching states corresponding to the three space vectors defining each segment, where the vector switching sequences defined for diagram segments that are symmetrically opposite with respect to the diagram origin comprise symmetrically opposite switching states. The method further includes obtaining a reference vector, which represents a desired state of the power conversion system, and determining the reference vector segment location in a space vector modulation diagram. Switching control signals are provided to the power conversion system according to the vector sequence listing for the reference vector segment location.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention will become apparent from the following detailed description of the invention when considered in conjunction with the drawings, in which:

FIG. 1D is a table showing dwell time computations for the SVM control system of FIGS. 1A-1C;

FIG. 1E is a table showing an exemplary switching sequence along with the corresponding dwell times for a specific SVM diagram segment;

FIGS. 2A and 2B are schematic diagrams illustrating an exemplary EHE SVM vector switching sequence for providing open-loop even-order harmonic suppression and neutral balancing using half-wave symmetric sequence entries according to other aspects of the invention;

DETAILED DESCRIPTION OF THE INVENTION

Figure 1A:
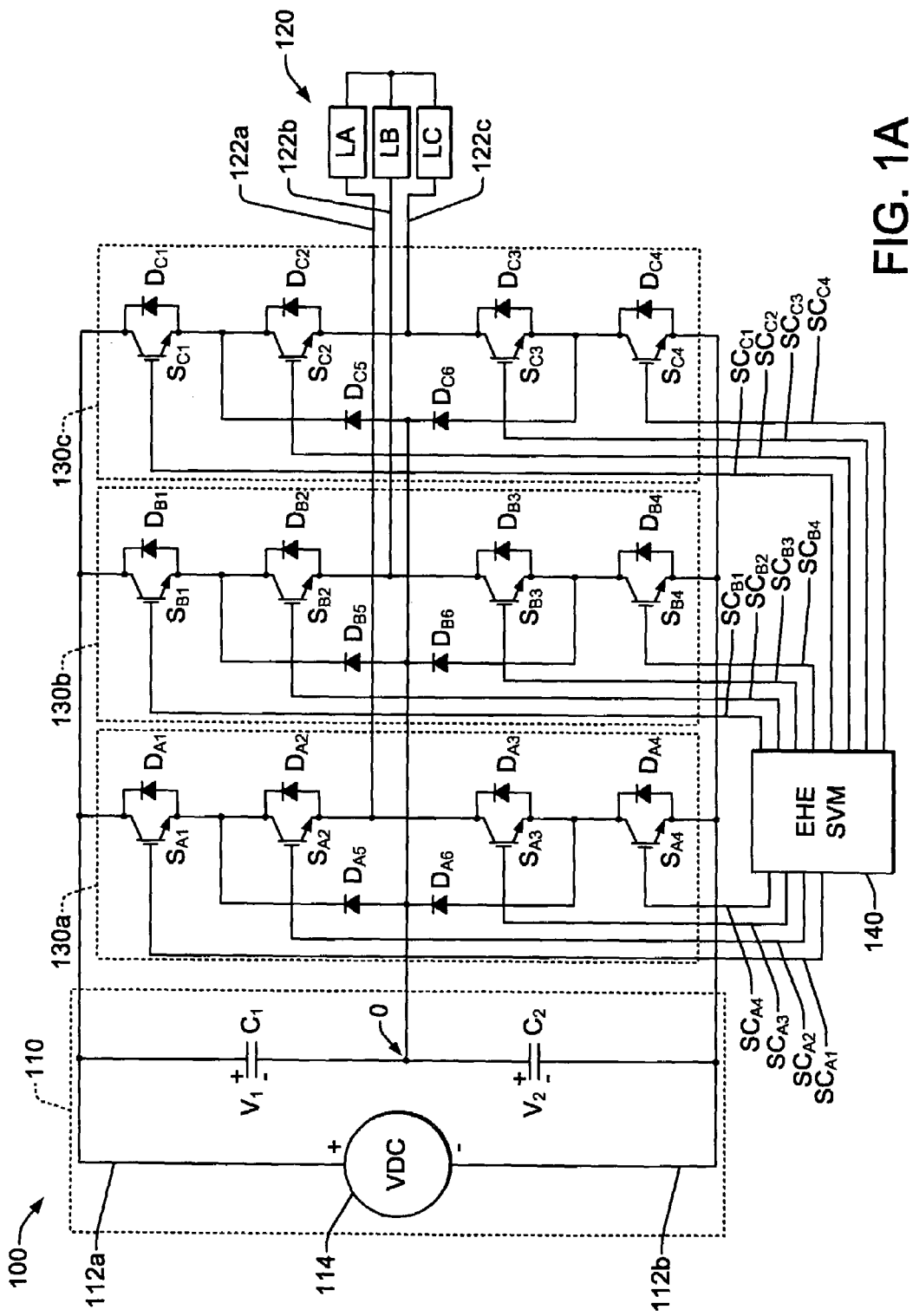
FIG. 1A is a schematic diagram illustrating an exemplary three-level inverter type DC to AC power conversion system having space vector modulation (SVM) switch control apparatus providing open-loop suppression of even-order harmonics and neutral point voltage balancing in accordance with one or more aspects of the present invention.

Referring now to the figures, several embodiments or implementations of the present invention are hereinafter described in conjunction with the drawings, wherein like reference numerals are used to refer to like elements throughout, FIG. 1A illustrates an exemplary three-level inverter power conversion system 100, including a DC connection 110, a three-phase AC connection 120, and a three-level switching network 130 including switch sets 130a, 130b, and 130c collectively coupling the DC and AC connections 110 and 120, respectively. The conversion system 100 further includes space vector modulation (SVM) switch control apparatus 140 that provides open-loop suppression of even-order harmonics to effectively balance a neutral point 0 (zero) of the DC connection 110 in accordance with one or more aspects of the invention. The DC connection 110 comprises first and second DC terminals 112a and 112b, respectively, for receiving DC power from a source 114, as well as first and second capacitors C1 and C2 coupled in series between the terminals 112, where the capacitors C1 and C2 are coupled at the common node or neutral point 0. The voltage across the terminals 112 can be referred to as a DC bus voltage, where the capacitors C1 and C2 are preferably of the same or substantially equal capacitance and voltage ratings, whereby the neutral point 0 ideally is at a voltage half-way between the voltages at the bus terminals 112 (e.g., at the mid-point of the DC bus voltage). The source 114 can be any source of DC power, with or without ripple voltages or other AC components, such as the output of a rectifier bridge, a switching rectifier that receives input AC (single or multi-phase) and provides rectified DC to the terminals 112, batteries, or other DC source. In one application as a medium voltage motor drive inverter, the DC bus voltage at terminals 112 can be several thousand volts.

The AC connection 120 includes three AC terminals 122a, 122b, and 122c coupled to a Y-connected three-phase load including phase loads LA, LB, and LC, respectively, such as motor windings in one example. Other multi-phase implementations are possible, wherein more than three AC terminals 122 are provided, with addition of a corresponding number of switch sets, such that each AC terminal 122 is selectively coupleable to one of the DC terminals 112 or to the neutral point 0 via space vector modulation switch control signals SC from the controller 140. The switching network 130 comprises sets 130a, 130b, and 130c of switching devices $S_{A1}$-$S_{A4}$, $S_{B1}$-$S_{B4}$, and $S_{C1}$-$S_{C4}$ associated with the AC phase terminals 122a, 122b, and 122c, respectively, wherein the switching devices S may be any form of switches that provide for selective electrical connection in a first state and electrical isolation in a second state, for example, GTOs, IGBTs, IGCTs, etc. (IGBTs in the illustrated embodiments). In the embodiments illustrated herein, moreover, the individual switching devices S include freewheeling diodes, illustrated in the figures as $D_{A1}$-$D_{A4}$, $D_{B1}$-$D_{B4}$, and $D_{C1}$-$D_{C4}$, associated with the switching devices $S_{A1}$-$S_{A4}$, $S_{B1}$-$S_{B4}$, and $S_{C1}$-$S_{C4}$, respectively.

In the illustrated inverter system 100, three sets 130a, 130b, and 130c are provided, each including four switches S connected in series between the DC bus terminals 112a and 112b, so as to provide selective connection of a corresponding AC terminal 122 to one of the DC terminals 112 or to the neutral 0. In operation, the switches S of each group 130a, 130b, and 130c are activated in pairs to achieve this three-level switching functionality for pulse width modulation by SVM techniques as described herein. With respect to phase A, for example, switches $S_{A1}$ and $SA_2$ are connected in series between the first DC terminal 112a and the AC terminal 122a, with the node between the switches $S_{A1}$ and $S_{A2}$ being connected to the DC connection neutral 0 via diode $D_{A5}$. In addition, switches $S_{A3}$ and $S_{A4}$ are connected in series between the AC terminal 122a and the second DC terminal 112b, with the node between the switches $S_{A3}$ and $S_{A4}$ also coupled to the neutral point 0 via diode $D_{A6}$. In this configuration, switching signals $SC_{A1}$-$SC_{A4}$ are provided to the control gates of the IGBTs $S_{A1}$-$SA_4$, respectively, for selective actuation by the control system 140. The first switch group 130a is provided with certain combinations of the control signals $SC_{A1}$-$SC_{A4}$ to achieve one of three switching states, so as to selectively connect the first AC phase terminal 122a with either the first (e.g., +) DC terminal 112a, the neutral 0, or the second (e.g., −) DC terminal 112b, corresponding respectively to a first switching state with switches $S_{A1}$ and $S_{A2}$ on, a second switching state with switches $S_{A2}$ and $S_{A3}$ on, and a third state with switches $S_{A3}$ and $S_{A4}$ on. The second and third switch sets 130b and 130c are similarly configured and selectively operated via corresponding switching signal sets $SC_{B1}$-$SC_{B4}$ and $SC_{C1}$-$SC_{C4}$, respectively, to selectively couple the corresponding AC terminal to the first DC terminal 112a, the neutral 0, or the second DC terminal 112b.

Figure 1B:
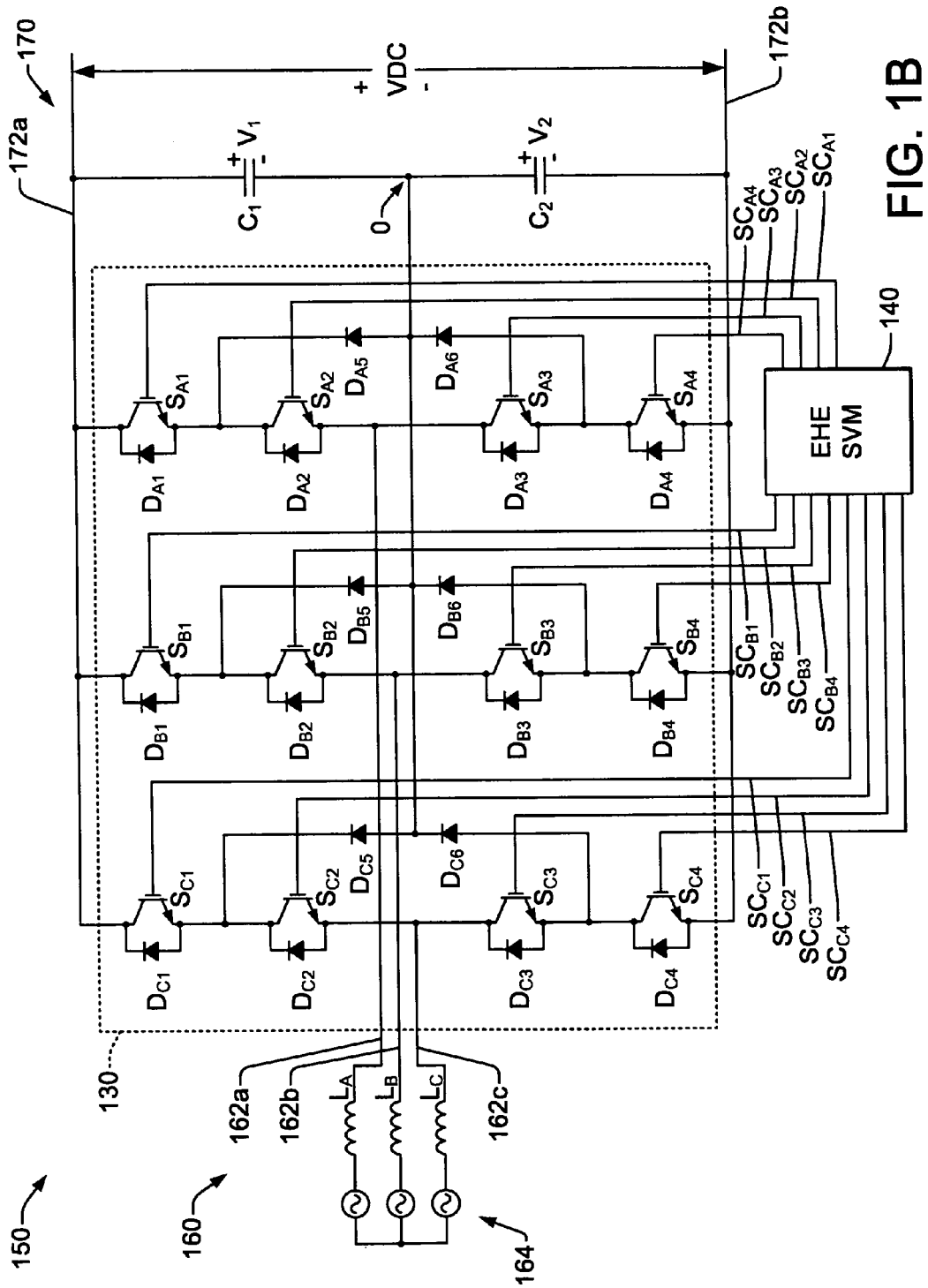
FIG. 1B is a schematic diagram illustrating an exemplary three-level SVM rectifier for converting multi-phase AC to DC electrical power using an even-order harmonic elimination (EHE) SVM switch control system in accordance with the invention.

FIG. 1B illustrates another preferred embodiment of a power conversion system 150 having an input AC connection 160 with terminals 162a, 162b, and 162c, as well as a DC output connection 170, in this case an NPC DC connection having DC terminals 172a and 172b, and two series connected capacitors C1 ands C2 defining a center neutral common node 0. The system 150 is constructed as a three-level NPC rectifier for converting a multi-phase AC input to DC electrical power using an even-order harmonic elimination (EHE) SVM switch control system 140 driving a switching network 130 as described above. In this embodiment, a three-phase AC power source 164 provides phase voltages at AC terminal lines LA, LB, and LC, which is then converted to a DC bus voltage on DC terminals 172, wherein the switching network 130 is actuated using the EHE SVM techniques described herein for open loop balancing of the neutral point voltage.

Figure 1C:
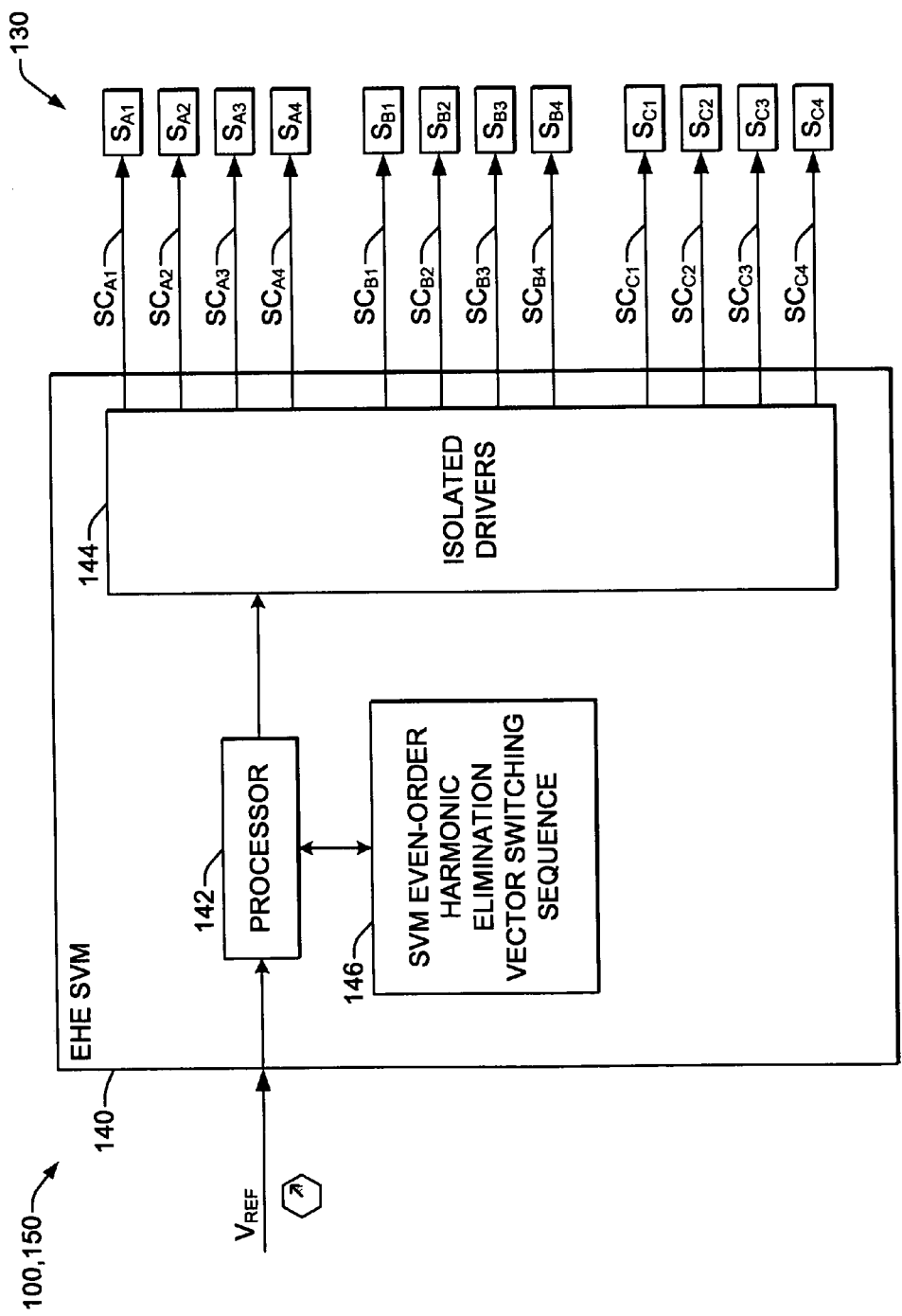
FIG. 1C is a schematic diagram illustrating an exemplary SVM control system of the power converters of FIGS. 1A and 1B, including drivers for actuating the power converter switches and a processor that controls the drivers by space vector modulation according to an EHE SVM vector switching sequence in order to balance the voltages across the capacitors and reduce even-order harmonics in open-loop operation of the power conversion system according to various aspects of the invention.

Referring also to FIG. 1C, the control system 140 used in the inverter and rectifier systems 100 and 150 is an even-order harmonic elimination (EHE) controller providing the sets of switching control signals SC by space vector modulation. Any suitable SVM system 140 can be used that provides neutral point balancing to equalize the voltages across the capacitors C1 and C2 in open-loop fashion during operation of the power conversion system 110, 150. The embodiment 140 is a processor-based system that includes memory (not shown) for storing data and instructions to carry out the functionality described herein, although other processing apparatus can be used, such as programmable logic, etc. As shown in FIG. 1C, the exemplary controller 140 provides a space vector modulation system with a processor 142 that controls isolated driver circuits or other driver means 144 for selectively actuating the switches S in the power converter switching network 130 for selective coupling of individual AC terminals 122, 162 to one of the DC terminals 112, 172 or the common node 0. The processor 142 can be any type of processing device, logic circuit, software, firmware, or combinations thereof, which forms a switch control means along with an SVM EHE vector switching sequence 146 for controlling the drivers 144 to balance the voltages across the capacitors C1 and C2 in open-loop fashion, in this case, by providing half-wave symmetric switching of the network 130, for both the case of an inverter 100 (FIG. 1A) or a rectifier (FIG. 1B). The switching sequence 146 can be a file, a data structure, a set of machine readable instructions or values, or any other representation, whether hardware, software, or combinations thereof that represents vector sequence listings for each segment of a space vector modulation diagram.

Figure 3:
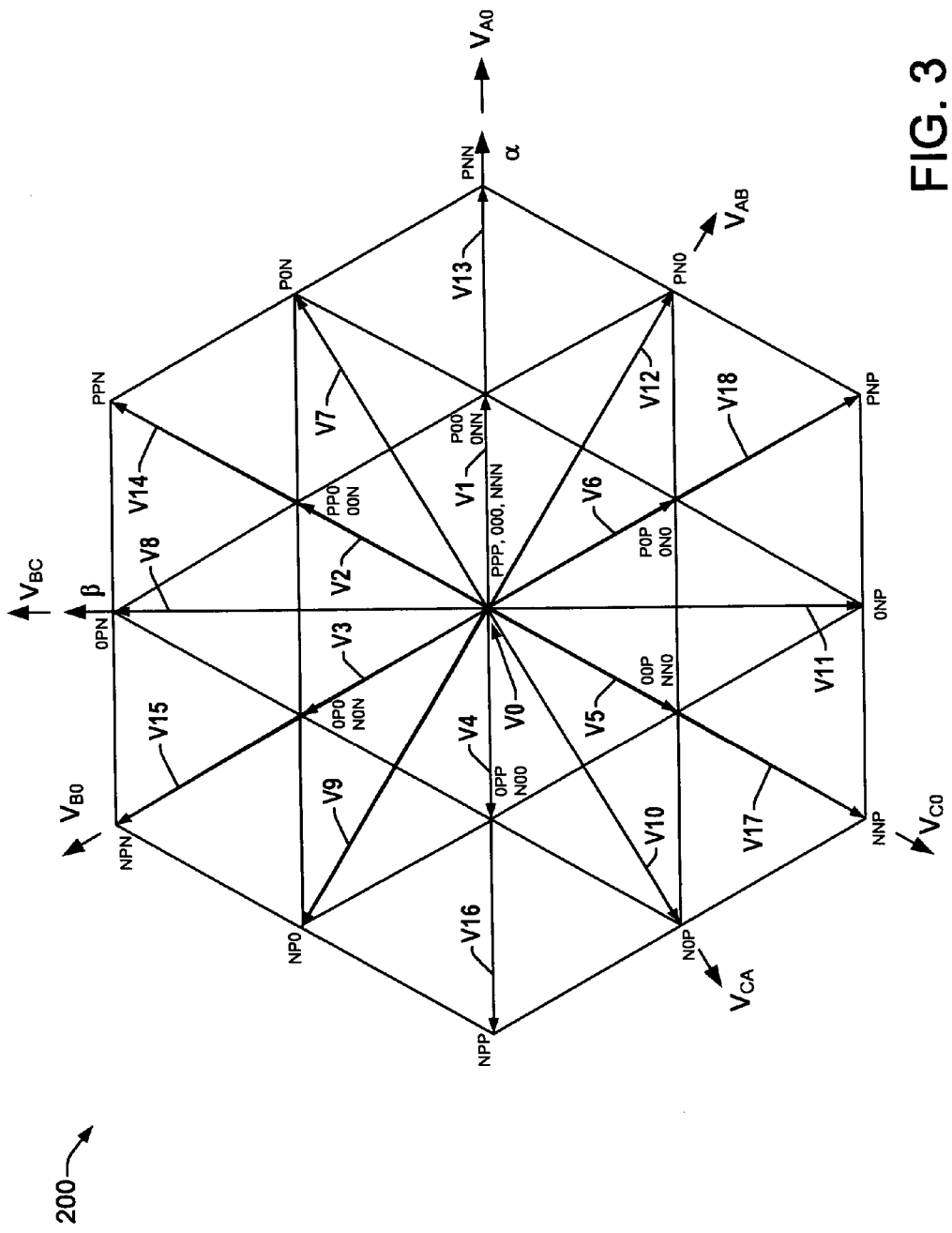
FIGS. 3 and 4 are schematic diagrams illustrating an exemplary SVM diagram showing space vectors that represent switching states for the power converter switching network and define six sectors with six triangular segments per sector.
Figure 4:
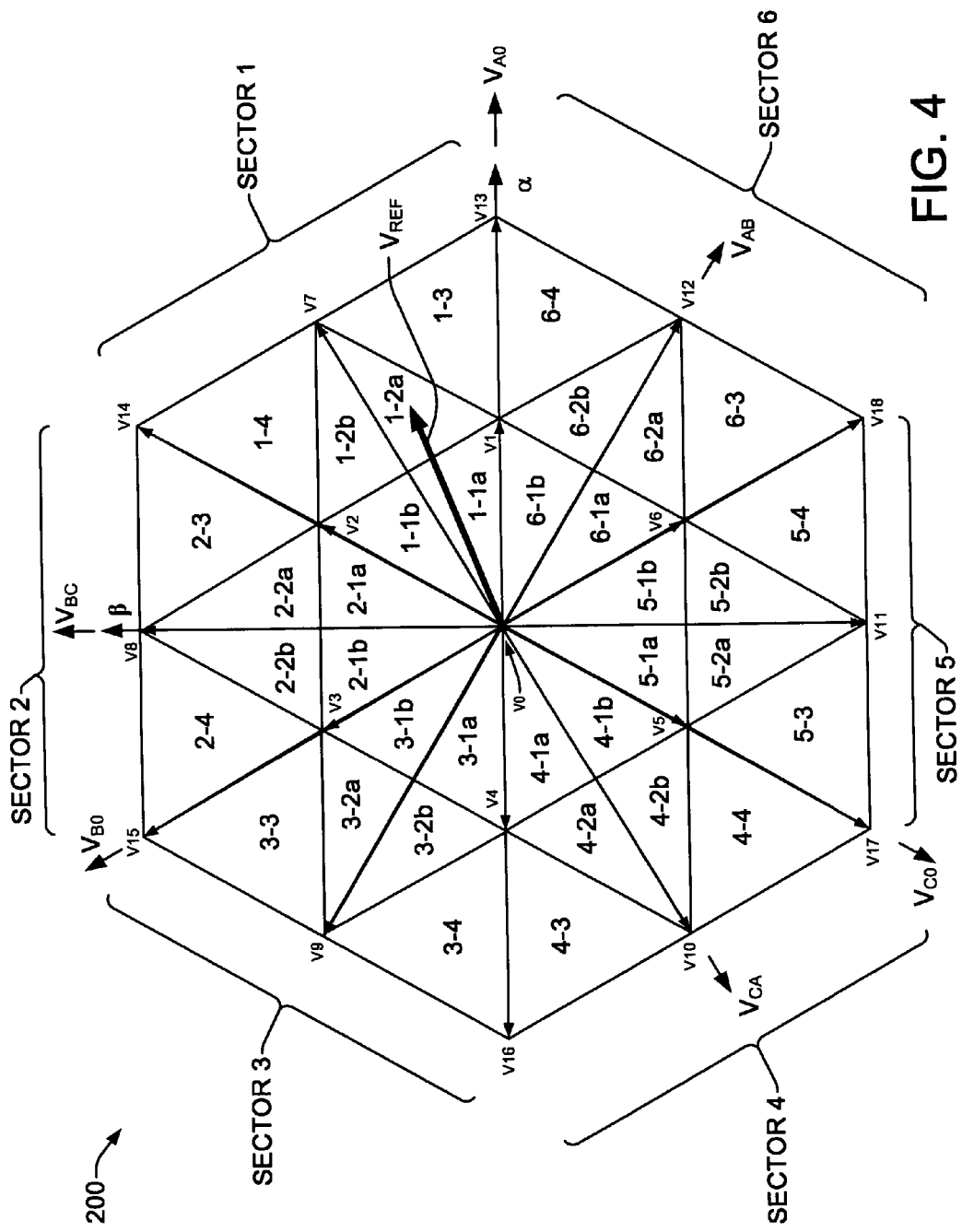

Referring also to FIGS. 3 and 4, an exemplary space vector modulation diagram 200 is shown. In operation of the power converter 100, 150, the processor 142 of FIG. 1C controls the drivers 144 according to a reference vector $V_{REF}$ (FIG. 4) and according to the EHE SVM vector switching sequence 146. In particular, the drivers 144 and hence the switching network 130 are controlled according to the current position of $V_{REF}$ in the space vector modulation diagram 200, which has 19 stationary space vectors V0-V18 that represent 27 switching states for the three-level switching network 130. The zero vector (V0) at the diagram center or origin has a magnitude of zero and includes three redundant switching states [PPP], [000], and [NNN], with the first numeral representing the switching state of the first switch set 130a (FIG. 1A), the second numeral corresponding to the second switch set 130b, and the third numeral representing the switching state of switch set 130c. In this regard, the numerals "0" represent the case where the corresponding switch set 130 connects the AC terminal 122 to the neutral 0 (e.g., switches $S_{A2}$ and $S_{A3}$ on in switch set 130a). Numerals "P" (e.g., positive) represent the case where the corresponding switch set 130 connects the AC terminal 122 to the first (+) DC terminal 112a (switches $S_{A1}$ and $S_{A2}$ on), and the numerals "N" (e.g., negative) represent the case where the corresponding switch set 130 connects the AC terminal 122 to the second (−) DC terminal 112b through corresponding actuation of a suitable pair of the switches S (switches $S_{A3}$ and $S_{A4}$ on). The diagram 200 of FIGS. 3 and 4 includes small vectors V1 to V6, all having a magnitude of Vd/3, and comprising two redundant switching states, one containing [P] and the other containing [N], and can therefore be alternatively indicated in the switching sequence (in FIGS. 2A and 2B below) as a P or N-type small vector, where Vd is the DC bus voltage at the terminals 112. In addition, the diagram 200 provides medium vectors V7 to V12, each having a magnitude of $3^{-2}$Vd/3, as well as large vectors V13 to V18), all having a magnitude of 2Vd/3.

The diagram 200 of FIGS. 3 and 4 is a two-level hexagon that defines six sectors (SECTOR 1 through SECTOR 6 in FIG. 4) positioned around the origin (the diagram center corresponding to the zero vector V0), with the sectors each having six triangular segments labeled K-1a, K-1b, K-2a, K-2b, K-3, and K4, where K is the sector number (1 through 6), as best shown in FIG. 4. Each segment is defined by a unique set of three space vectors V at the corners of the corresponding triangle, where the triangular segments 1-1a and 1-1b are formed as a subset, each corresponding to the triangle formed by vectors V0, V1, and V2, and other such subsegments are accordingly defined in the diagram 200. The position of the reference vector $V_{REF}$ at any given time is ascertained by the SVM controller processor 142, which then consults the corresponding entry list in the switching sequence 146 for selectively sequencing the switching control signals SC through various combinations of three-level patterns corresponding to the three defining space vectors V for the current segment to implement the space vector modulation of the switching network 130. Further, the durations of the switching patterns (dwell times) are determined according to the particular $V_{REF}$ position within the given triangular diagram segment, taking into account the proximity of the reference vector $V_{REF}$ to each of the three defining space vectors V.

Referring also to FIGS. 1D and 1E, the exemplary reference vector location in segment 1-2a of FIG. 4 provides a vector modulation involving the defining vectors V1, V2, and V7. The times Ta, Tb, and Tc during which the controller 140 dwells at a particular switching state for V1, V7, and V2, respectively, are computed according to the relationship V1Ta+V7Tb+V2Tc=VrefTs, where the sample period Ts=Ta+Tb+Tc and Ts is computed according to the selected rotational frequency of the reference vector $V_{REF}$ (Ts=1/f according to the sampling frequency f of the inverter system 100). Knowing the sample period Ts and the modulation index $m_a$, the dwell times for a given segment are computed according to the formulas in table 148a of FIG. 1D, and the switching state sequence and corresponding times are shown in table 148b of FIG. 1E for the exemplary reference position with $V_{REF}$ in diagram segment 1-2a. In this manner, the SVM control system 140 performs space vector modulation of the network switches 130 according to the reference vector position and according to the EHE vector switching sequence 146.

FIGS. 2A and 2B illustrate further details of the exemplary EHE SVM vector switching sequence 146, which provides open-loop even-order harmonic suppression or elimination (EHE) through half-wave symmetric sequence entries. In this regard, the inventors have appreciated that half-wave symmetry in the SVM switching sequence 146 facilitates reduction of even order harmonics in the AC power, and further that even-order harmonic elimination enhances the neutral voltage balance in the DC connection 110, 170 without requiring feedback control for NPC converters 100, 150. Moreover, the exemplary sequence 146 of FIGS. 2A and 2B provides this open-loop even-order harmonic elimination through careful selection of the sequence entries for the SVM diagram segments. The vector switching sequence 146 can be any form of data store, list, database, file, etc., according to which a three-level NPC power conversion system can be operated with open-loop neutral voltage balancing.

In the illustrated embodiments, the sequence 146 is comprised of a machine readable medium, such as processor readable memory for example, that includes vector sequence listings for each of the six segments defined by the SVM diagram 200, where the individual listings are shown as seven-entry columns in the table format representation in FIGS. 2A and 2B. While the individual vector sequence listings for each segment include seven switching state entries in the exemplary sequence 146, other embodiments are possible, in which any number of three or more entries can be provided for each sector-specific listing. The row and column format illustrated in FIGS. 2A and 2B is merely for ease of understanding, and the actual sequence 146 may be stored in any suitable format by which a sequence can be indexed according to the reference vector sector location. Moreover, while the listings each define a sequence of switching states corresponding to the three space vectors defining the corresponding diagram segment with switching states provided for each of three AC connection phase terminals 122, 162, other embodiments may be constructed for converters having more than three AC phases, wherein the corresponding entries in the sequence 146 will be provided with a corresponding number of additional numeral entries (P, 0, or N).

To illustrate operation of the sequence 146 when employed in the above converter embodiments, it is initially noted that the entry for sector 1-2a in FIG. 2A provides a succession of vectors $V_{1P}$, $V_7$, $V_{2N}$, $V_{1N}$, $V_{2N}$, $V_7$, and $V_{1P}$ defining three-level SVM switch states P00, P0N, 00N, 0NN, 00N, P0N, and P00, respectively. In the illustrated sequence 146, moreover, the vector switching sequences defined for diagram segments that are symmetrically opposite with respect to the diagram origin (diametrically opposite segments) comprise symmetrically opposite switching states. Thus, as seen in FIG. 4, the sector 4-2a is diametrically opposite the reference vector segment 1-2a. As seen in the sequence 146 in FIG. 2B, the entry for sector 4-2a in FIG. 2A provides symmetrically opposite switching states N00, N0P, 00P, 0PP, 00P, N0P, and N00 through successive provision of vectors $V_{4N}$, $V_{10}$, $V_{5P}$, $V_{4P}$, $V_{5P}$, $V_{10}$, and $V_{4N}$, respectively. In this manner, half-wave symmetry is ensured at the AC connections 120, 160, resulting in suppression or substantial elimination of even-order harmonics and neutral point voltage balance at the DC connections 110, 170. This balancing, moreover, is achieved in open-loop fashion, whereby complicated and costly closed-loop neutral balance controls are not needed. As seen in FIGS. 2A and 2B, the vector sequence listings for each segment include seven switching state entries individually indicating one of three possible switching state levels positive (P), zero (0), or negative (N) for each of the three switching groups 130 (e.g., for each AC phase) in the conversion system, where the vector sequence listings for each pair of first and second diagram segments that are diametrically opposite relative to the diagram origin (V0) comprise symmetrically opposite switching states, with positive (P) levels in the entries of the listing for the first segment corresponding to negative (N) levels in the entries of the listing for the second segment and vice versa. In this manner, as the reference vector rotates around one revolution of the space vector diagram 200, the individual phase voltage waveforms (both line-to-line and line-to-neutral) include a positive half cycle and a symmetrical negative half-cycle, as illustrated and described further below with respect to FIGS. 5, and 10A.

Figure 1F:
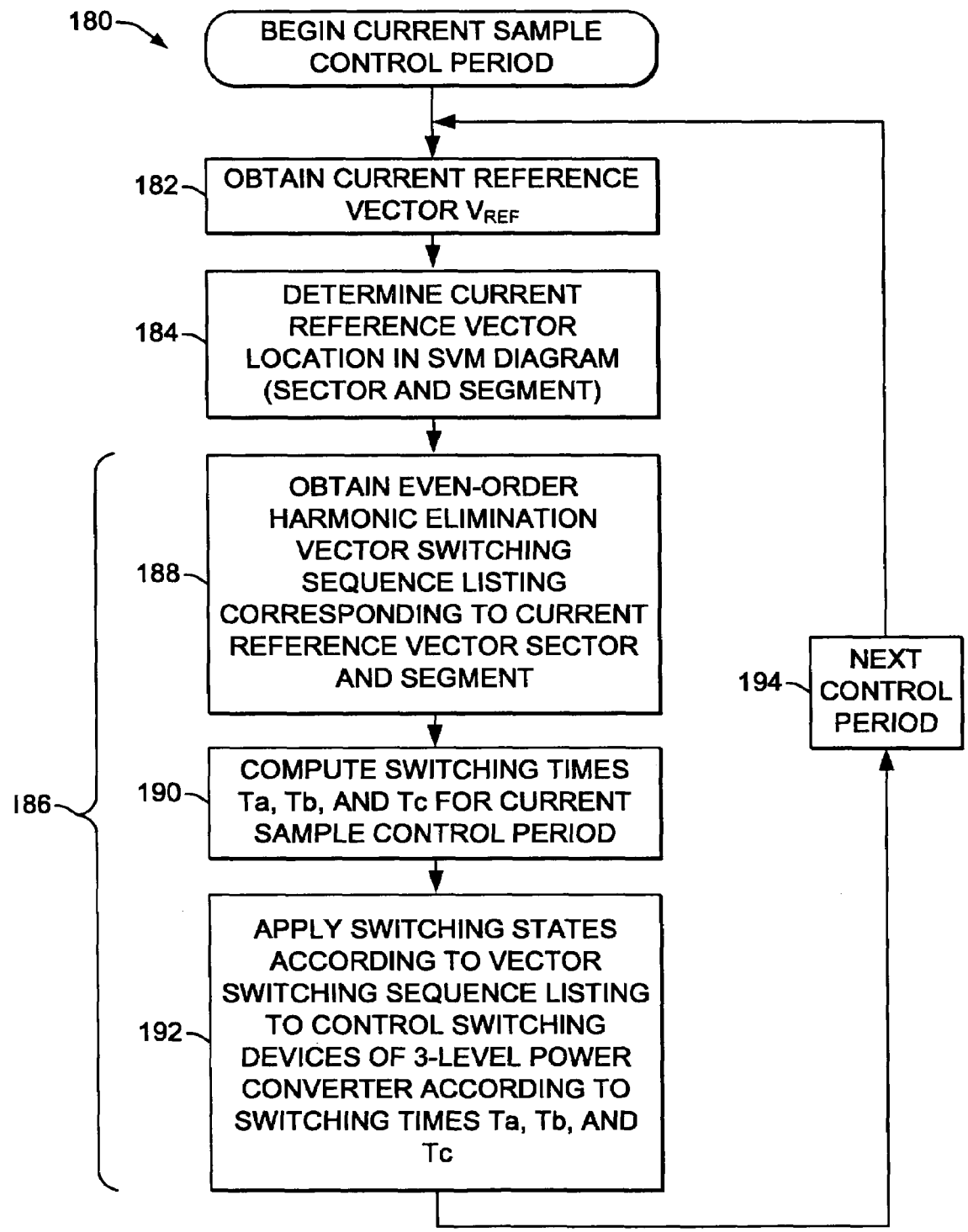
FIG. 1F is a flow diagram illustrating an exemplary method for SVM control of a three-level power conversion system according to further aspects of the invention.

Turning now to FIG. 1F, an exemplary method 180 is illustrated for space vector modulation control of a three-level power conversion system according to further aspects of the invention. While the method 180 is illustrated and described below in the form of a series of acts or events, it will be appreciated that the various methods of the invention are not limited by the illustrated ordering of such acts or events. In this regard, except as specifically provided hereinafter, some acts or events may occur in different order and/or concurrently with other acts or events apart from those illustrated and described herein in accordance with the invention. It is further noted that not all illustrated steps may be required to implement a process or method in accordance with the present invention, and one or more such acts may be combined. The illustrated methods and other methods of the invention may be implemented in hardware, software, or combinations thereof, in order to provide the SVM modulation control functionality described herein, and may be employed in any three-level pulse width modulated NPC power conversion system including but not limited to the above illustrated systems 100 and 150, wherein the invention is not limited to the specific applications and embodiments illustrated and described herein.

The method 180 is performed in a generally continuous loop fashion, where a current sample control period begins at 182 by obtaining the reference vector $V_{REF}$ representing the desired state of the power conversion system. The method 180 continues at 184 where the reference vector segment location (sector and segment) in the SVM diagram 200 is determined. Based on the current location of $V_{REF}$, switching control signals are provided at 186 to the power conversion system according to a vector sequence listing for the reference vector segment and sector location, where the sequence listing provides for half-wave symmetrical sequence definitions. In the illustrated example, the provision of the switching control signals at 186 comprises obtaining a vector switching sequence listing at 188 that corresponds to the reference vector location from an SVM vector switching sequence that includes sequence listings defined for diametrically opposite diagram segments that comprise symmetrically opposite switching states, as in the exemplary sequence 146 in FIGS. 2A and 2B above. At 190, switching times are computed (e.g., Ta, Tb, and Tc above) for application of the individual switching states of the vector sequence list in the current sample control period, and the switching states of the vector sequence list are applied at 192 to control the power conversion system according to the computed switching times. Thereafter, the next control period starts at 194 and the process 180 repeats for subsequent control cycles as described above.

Figure 5:
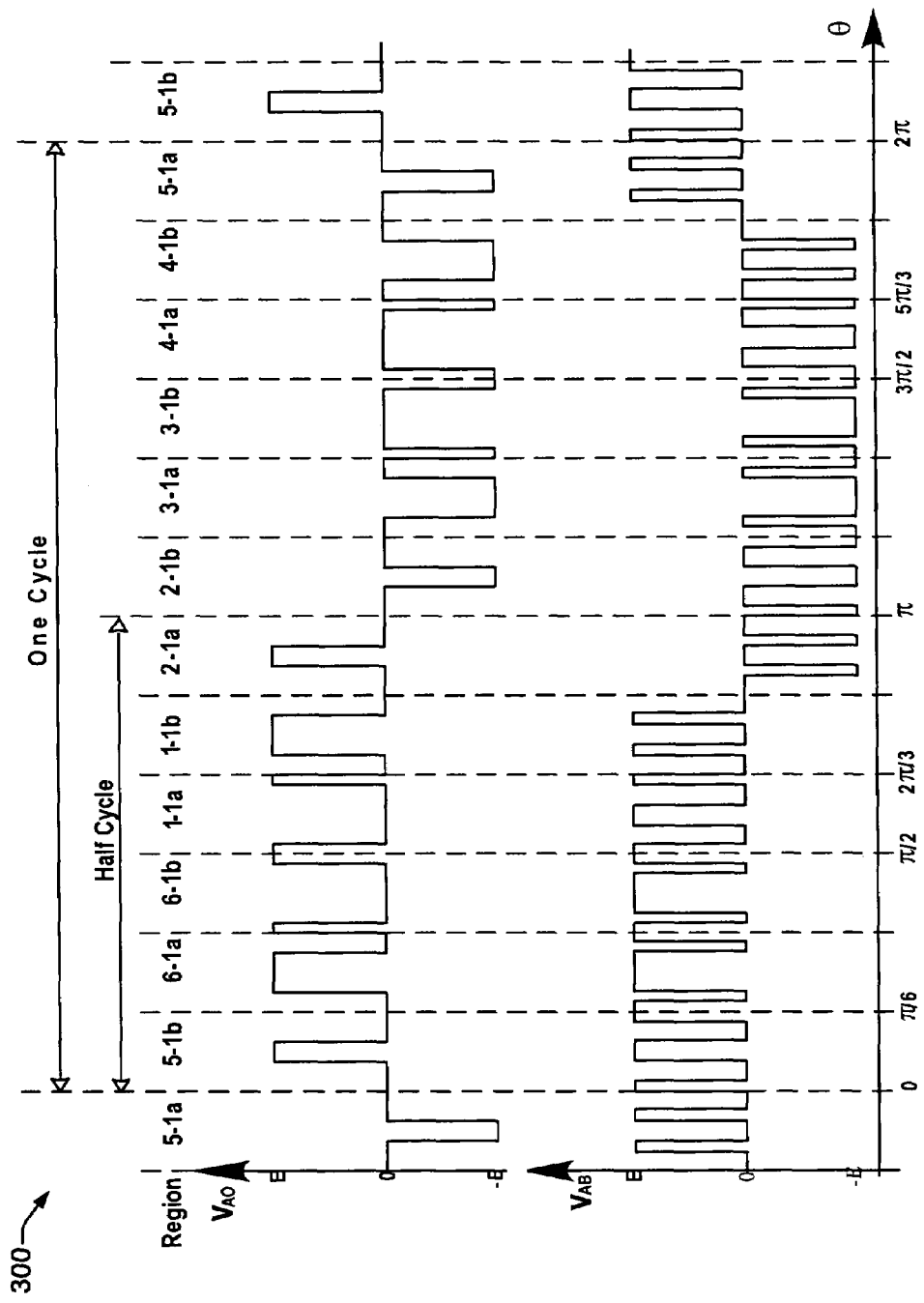
FIG. 5 is a graph illustrating exemplary simulated half-wave symmetric phase voltage waveforms $V_{AO}$ and $V_{AB}$ for the three phase inverter of FIG. 1A as the reference vector rotates in one full cycle.

Referring now to FIGS. 5-8, simulated results are illustrated for the three-level NPC SVM inverter of FIG. 1A using the above described EHE modulation concepts of the invention. The NPC inverter 100 was simulated for a power rating of 1 MVA and operation at an AC output frequency of 60 Hz, with three-phase loads LA, LB, and LC individually including series connected 17.3 OHM resistors and 2.3 mH inductors. The simulated input DC voltage at terminals 112 was 5600 volts DC, using 2400 μF capacitors C1 and C2 with a sampling frequency of 1.44 KHz. FIG. 5 illustrates a graph 300 showing the resulting simulated line-to-line and line-to-neutral phase voltage waveforms $V_{AO}$ and $V_{AB}$ for a full cycle in the inverter 100, showing the half-wave symmetry that may be achieved by the careful definition of the switching sequence 146. As noted above, the inventors have found that this half-wave symmetry reduces the even order harmonics, and also results in effective neutral-point voltage balancing without need for closed loop adaptation.

Figure 6:
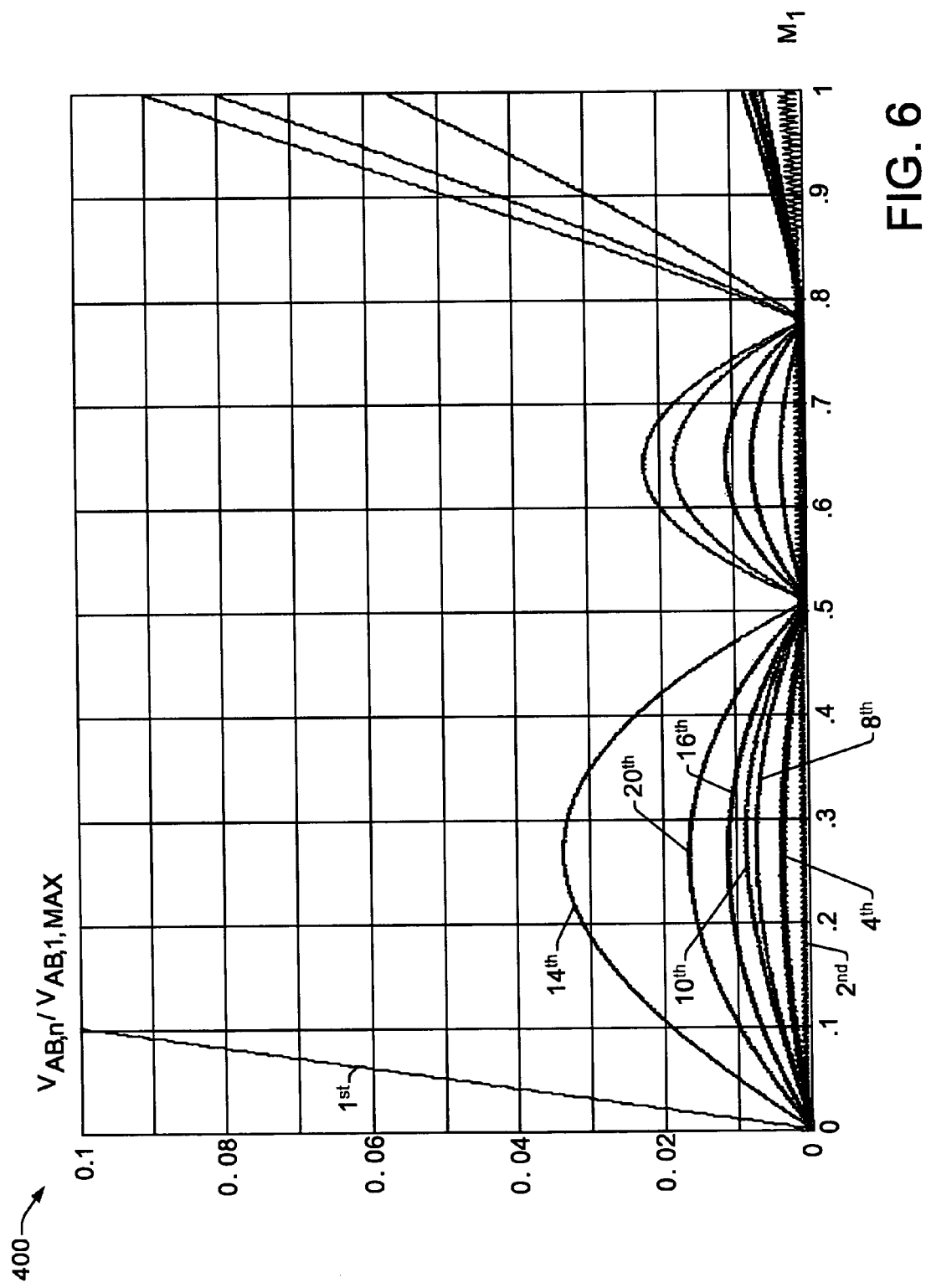
FIG. 6 is a graph illustrating simulated even-order harmonic content of an inverter line-to-line waveform in a three-level SVM controlled inverter using a conventional SVM switching control scheme.

To illustrate this performance advantage, FIG. 6 provides a graph 400 illustrating even-order harmonic content of the line-to-line waveform, plotted as a function of modulation index MI, in a similarly designed three-level SVM modulated inverter using a conventional SVM switching control scheme. In this graph 400, $V_{AB,n}$ is the rms value of the nth order harmonic, $V_{AB,1,MAX}$ is the maximum rms value of the fundamental component in the line-to-line phase voltage $V_{AB}$, and MI is the modulation index. As can be seen in the graph 400, the even-order harmonics are significant using the conventional SVM converter control technique. In this regard, prior SVM approaches provided for vector sequence selection with two design considerations or goals, primarily to limit the switching frequency of the switches S in the converter switching network 130. The first conventional SVM sequence design criteria is that the transition from one switching state to the next (within a given segment) should involve only two switch changes, one being turned off and the other being turned on. The other typical design goal is that transitions from one SVM diagram segment to the next should involve a minimum number of switch state changes, preferably two or less. These design goals or considerations were taken into account in selecting the conventional switching sequence used in the simulated performance represented in FIG. 6. As noted in the graph 400, however, the conventional SVM approach produces a significant amount of even order harmonics, leading to large neutral point imbalance problems in three-level power conversion applications.

Figure 7:
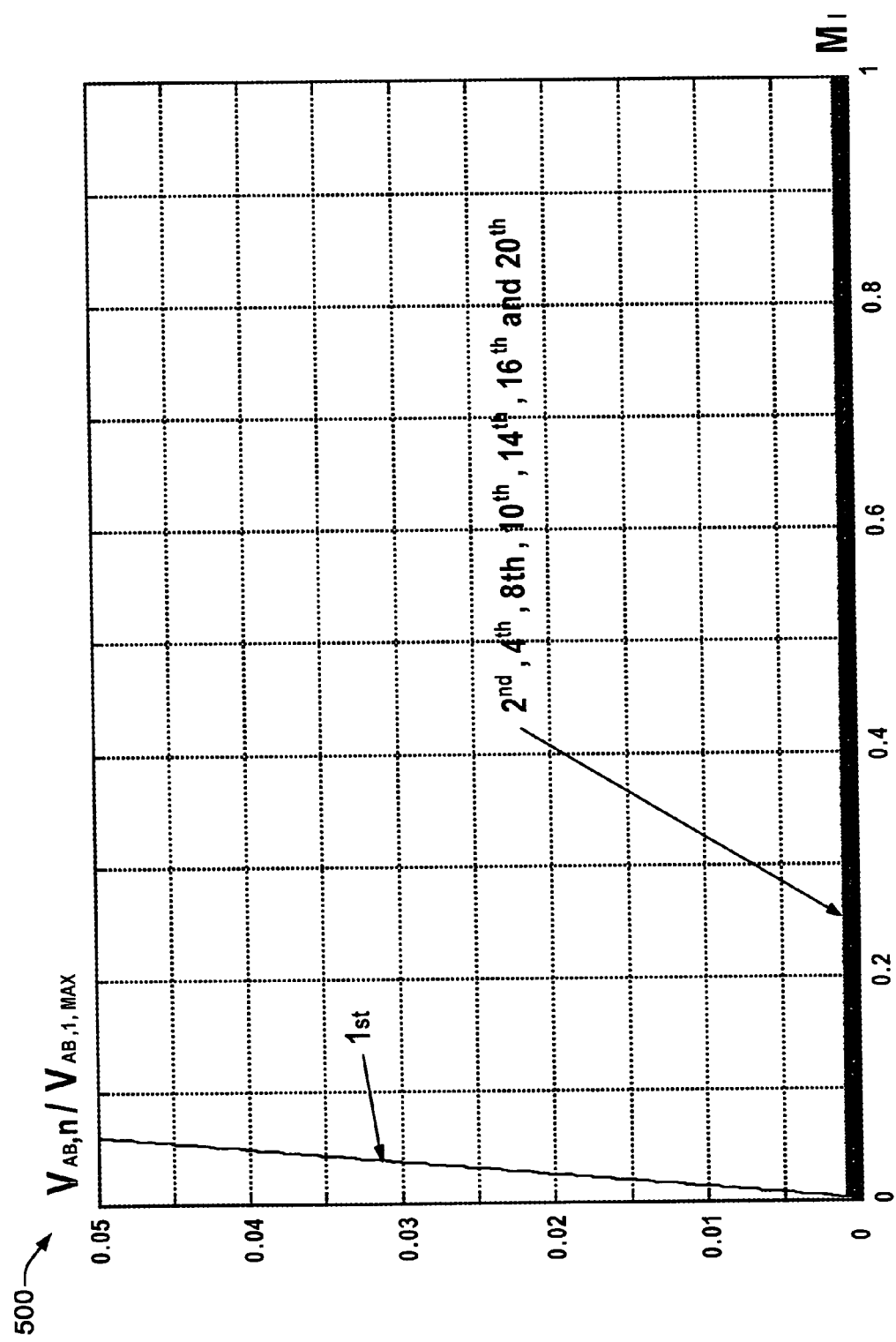
FIG. 7 is a graph showing simulated even-order harmonic content in a three-level SVM controlled inverter such as the one in FIG. 1A using the SVM control system of FIG. 1C and the EHE SVM vector switching sequence of FIGS. 2A and 2B.

Referring now to FIG. 7, a graph 500 illustrates the simulated even-order harmonic content in a three-level SVM controlled inverter such as the inverter 100 of FIG. 1A using the SVM control system 140 of FIG. 1C with the EHE SVM vector switching sequence 146 of FIGS. 2A and 2B. The graph 500 clearly shows that the line-to-line voltage $V_{AB}$ produced by using the half-wave symmetrical sequence 146 effectively suppresses or eliminates all the even-order harmonics in the AC output. As discussed above with respect to FIGS. 2A and 2B, the EHE vector switching sequence 146 is arranged such that the inverter phase voltage generated by $V_{REF}$ in any two regions symmetrical to the origin of the space vector diagram 200 have mirror image voltages, by which the sequence 146 achieves half-wave symmetry, as shown in FIG. 5. The simulated results in the graph 500 of FIG. 7 and the waveforms of FIG. 5 illustrate that the EHE SVM system 140 provides open-loop waveform symmetry along with even-order harmonic elimination.

Figure 8:
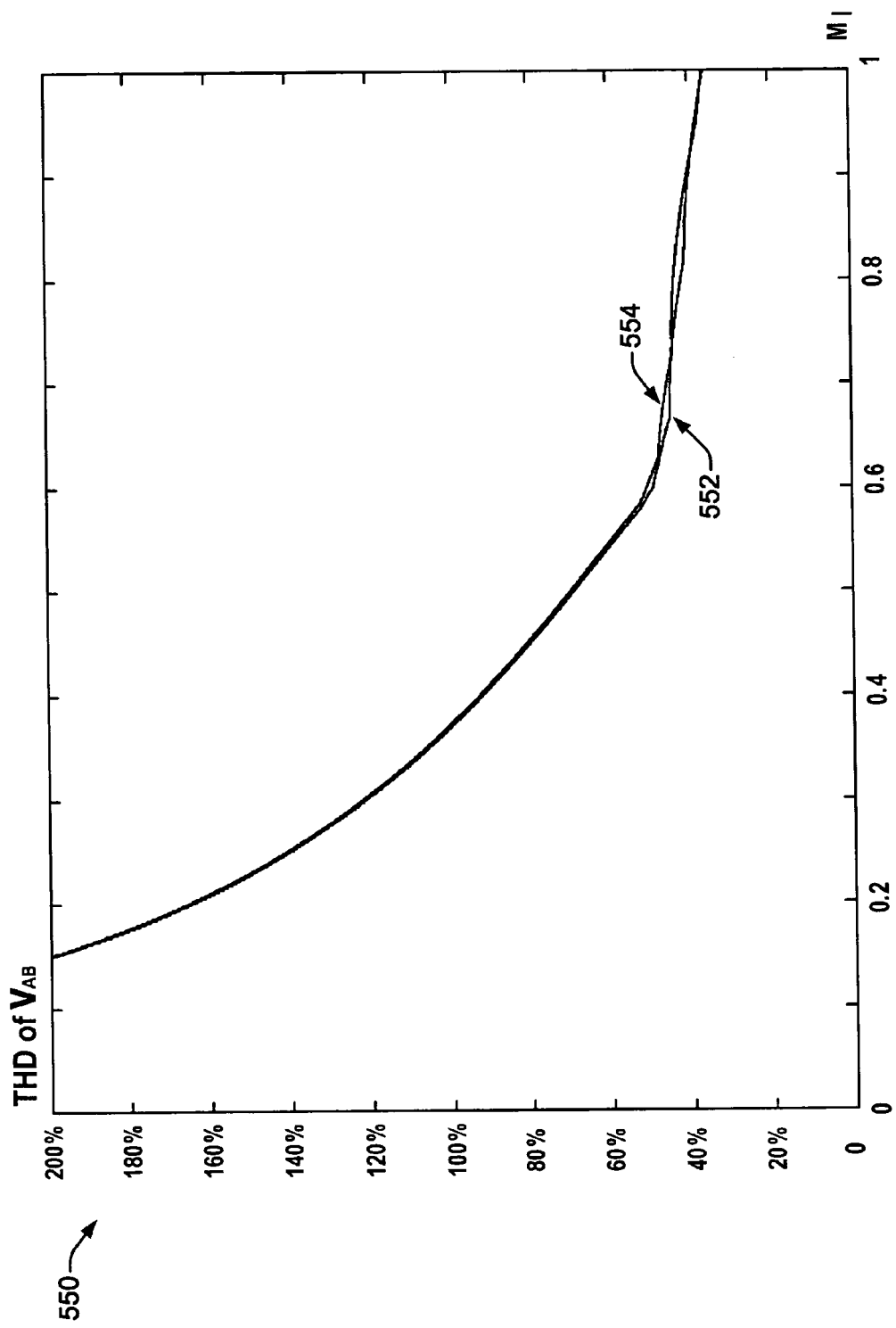
FIG. 8 is a graph illustrating simulated comparative total harmonic distortion (THD) performance for a conventional SVM approach and for an SVM modulation control system of FIG. 1C using the EHE SVM vector switching sequence of FIGS. 2A and 2B.

Referring also to FIG. 8, the inventors have also simulated the total harmonic distortion (THD) performance of the sequence 146, as shown in graph 550 illustrating the $V_{AB}$ THD profiles 552 and 554 produced by the conventional SVM sequence and the new EHE SVM sequence scheme 146, respectively. As can be seen in the graph 550, the sequence 146 sacrifices essentially little or no THD performance compared with the conventional technique, wherein the curves 552 and 554 are nearly identical. While not wishing to be tied to any particular theory, it is believed that the comparable THD performance is due to the use of the same stationary vector selection and dwell time calculations in the two simulated cases. Moreover, the exemplary EHE SVM sequence 146 of FIGS. 2A and 2B satisfies the criteria that the transition from one switching state to the next (within a given segment) should involve only two switch changes, while relaxing the above-mentioned convention restriction that transitions from one SVM diagram segment to the next should involve minimum number of switch state changes. However, the device switching frequency of the new sequence 146 is only slightly higher than that of the conventional scheme for a given sampling frequency. For example, in the above mentioned simulation conditions, the device switching frequency is 750 Hz using a conventional switching sequence, whereas the device switching frequency using the illustrated EHE sequence 146 rises to only 780 Hz, wherein some of the transitions for $V_{REF}$ moving from segment to segment involve four switches for the new scheme instead of two for the conventional scheme. Thus, while relaxing the second conventional design consideration might at fist seem undesirable, the provision of the half-wave symmetry by the exemplary EHE sequence 146 provides significant advantages with respect to neutral point balancing and even-order harmonic elimination, while allowing only minor switching frequency increase, and without sacrificing THD performance.

Figure 9A:
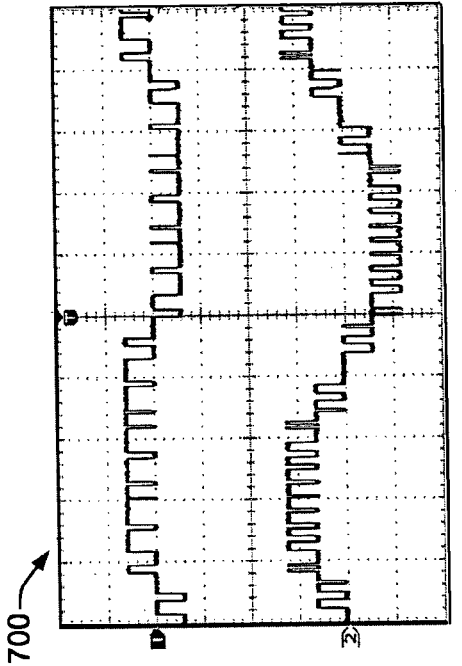
FIG. 9A is a graph illustrating experimental line-to-neutral and line-to-line voltage waveform plots in a three-level SVM controlled inverter using a conventional SVM switching control scheme.

Referring now to FIGS. 9A-11, experimental results also bear out the performance advantages of the open-loop SVM EHE concepts described above. A three-level inverter of the type shown in FIG. 1A was evaluated using two seven-entry SVM switching sequences for comparison and verification of new EHE SVM technique. The first SVM sequence was a conventional SVM scheme having both even-order and odd-order harmonics, whereas the second experiment used the EHE switching sequence 146, which does not produce even-order harmonics. The experimental parameters used in both cases include a DC voltage at terminals 112 of 300 VDC to produce a line-to-line AC output voltage of 208 VAC, with DC capacitors C1=C2=4700 uF, and AC phase loading comprising a 3.2 OHM resistor and a 15 mH inductor, with a PWM sampling frequency of 1080 Hz, wherein the modulation index MI is the peak value of Vab/Vdc, approximately 0.9 in both experiments. FIG. 9A provides a graph 600 illustrating experimental line-to-neutral and line-to-line voltage waveform plots Va0 and Vab, respectively, in a three-level SVM controlled inverter using a conventional SVM switching control scheme, and FIG. 9B shows a corresponding graph 610 illustrating experimental line-to-neutral and line-to-line voltage odd and even-order harmonic content plots in the SVM inverter using the conventional SVM switching control scheme. As shown in the waveform plots of graph 600, the conventional SVM technique fails to provide waveform symmetry, and the plot 610 of FIG. 9B illustrates the presence of significant even-order harmonics in the AC output.

Figure 10A:
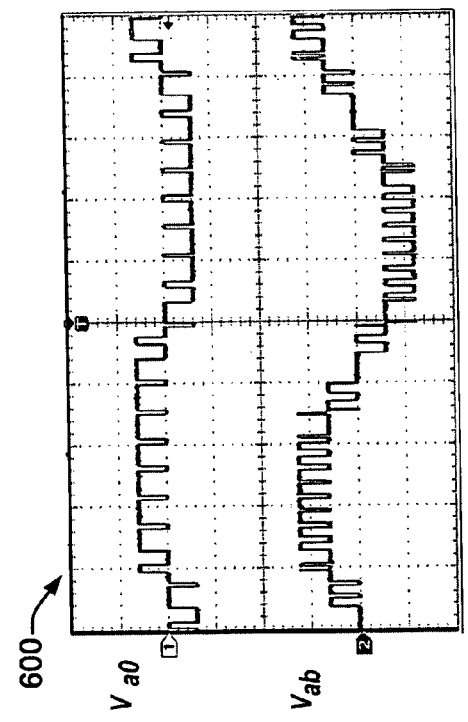
FIG. 10A is a graph illustrating experimental line-to-neutral and line-to-line voltage waveform plots in a three-level SVM controlled inverter such as the one in FIG. 1A using the SVM control system of FIG. 1C and the EHE SVM vector switching sequence of FIGS. 2A and 2B.
Figure 9B:
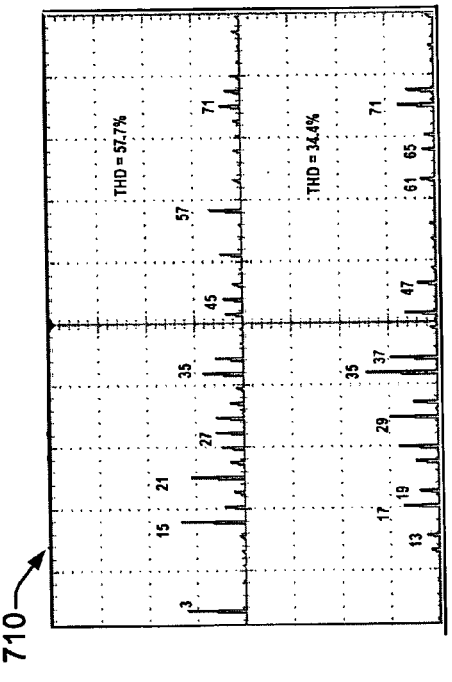
FIG. 9B is a graph corresponding to FIG. 9A showing experimental odd and even-order harmonic content plots in the SVM inverter using the conventional SVM switching control scheme.
Figure 10B:
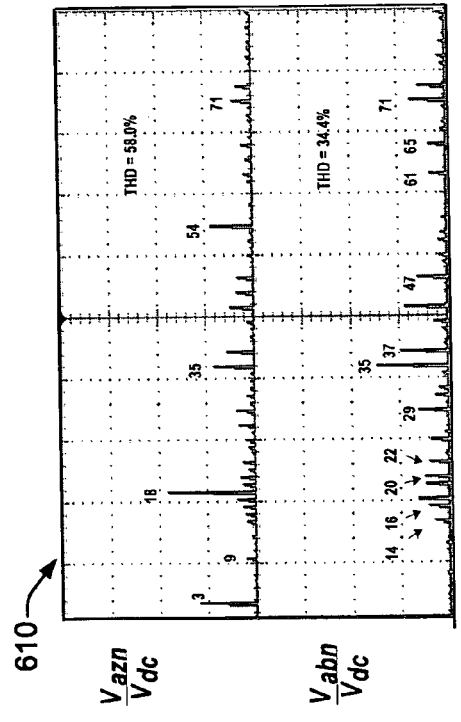
FIG. 10B is a graph corresponding to FIG. 10A illustrating experimental odd and even-order harmonic content plots in the SVM inverter, with significant even-order harmonic suppression.

FIGS. 10A and 10B shown comparative plots 700 and 710, respectively, using the above described EHE SVM approach for open loop even-order harmonic suppression (e.g., employing the sequence 146 of FIGS. 2A and 2B). The graph 700 in FIG. 10A illustrates experimental line-to-neutral and line-to-line voltage waveform plots in the three-level SVM controlled inverter 100 of FIG. 1A using the SVM control system 140 of FIG. 1C and the EHE SVM vector switching sequence 146 of FIGS. 2A and 2B, wherein the half-wave symmetry of the line-to-neutral and line-to-line voltage waveforms can be seen in FIG. 10A. Moreover, the harmonic content graph 710 of FIG. 10B shows corresponding experimental harmonic content plots in the EHE SVM inverter 100, with significant even-order harmonic suppression compared with the plot 610 of FIG. 9B. Thus, the experiments show that the EHE SVM technique provides open-loop control over even-order harmonics in three-level NPC power conversion systems.

Figure 11:
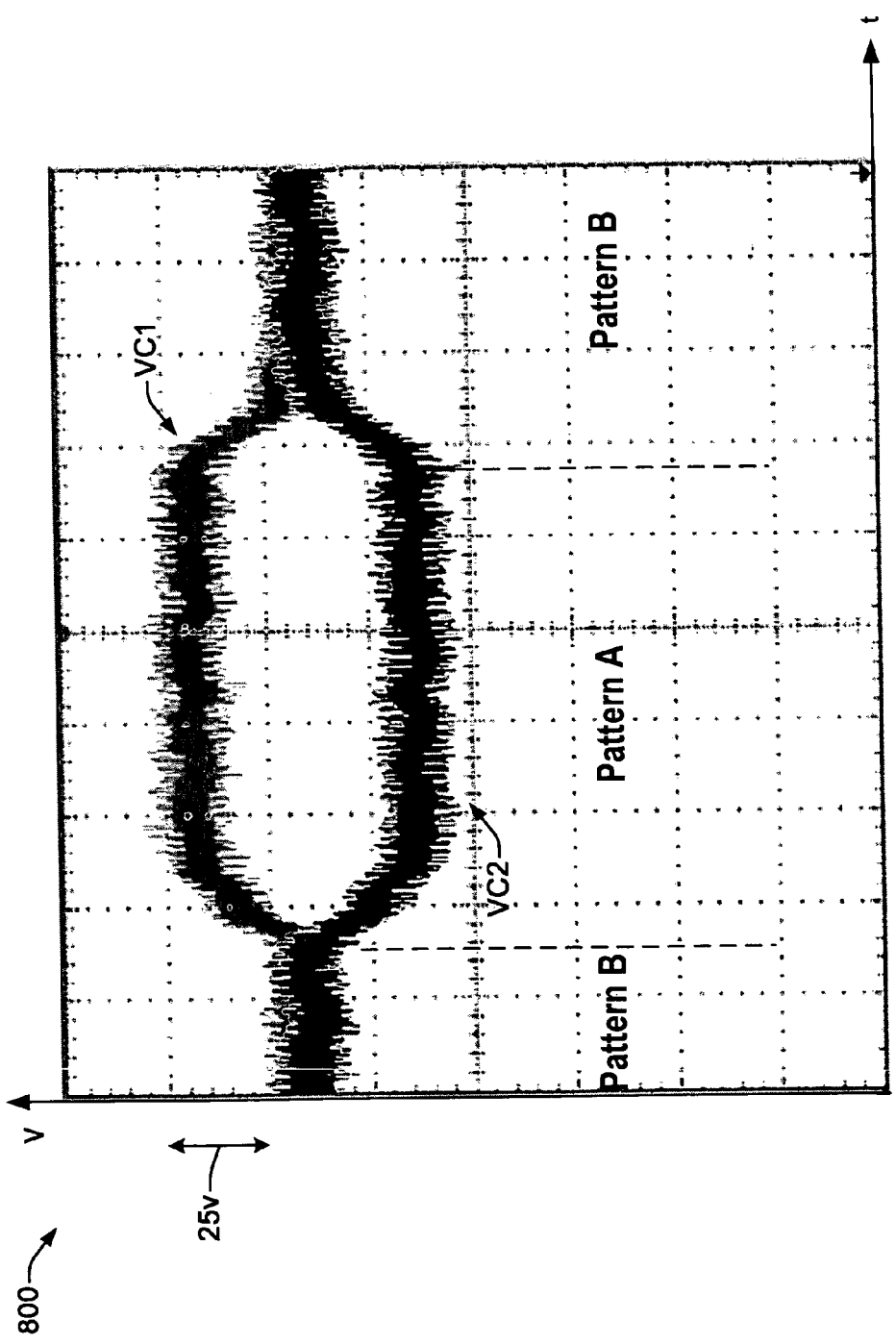
FIG. 11 is a graph showing plots of experimental comparative voltage balancing situations for the conventional and EHE SVM techniques.

FIG. 11 shows a plot 800 illustrating the corresponding experimental voltages VC1 and VC2 across capacitors C1 and C2, respectively, as a function of time, with the voltage scaling being 25 volts per division. The plot 800 shows experimental comparative voltage balancing situations for the conventional and EHE SVM techniques, with the conventional SVM switching sequence being shown as Pattern A and the EHE SVM sequence 146 being indicated as Pattern B in the graph 800. As can be clearly seen in FIG. 11, when the new SVM sequence 146 is applied (Pattern B), the DC voltages VC1 and VC2 across capacitors C1 and C2 are virtually identical (good open-loop neutral point balancing). Conversely, application of the conventional SVM sequence (Pattern A) causes the neutral point to vary significantly from the mid-level of the DC bus, with the capacitor voltages VC1 and VC2 differing in the plot 80 by as much as approximately 60 VDC. Therefore, the present invention may be implemented to provide significant advantages with respect to neutral point voltage balancing and even-order harmonic elimination, without adversely affecting the THD performance, without significant switching frequency degradation, and without the complexity or expense of closed loop neutral balancing systems.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A three-level power conversion system, comprising:
   a DC connection for receiving or supplying DC electrical power, the DC connection comprising first and second DC terminals and first and second capacitors coupled in series between the first and second DC terminals, the capacitors being coupled at a common node;
   a multi-phase AC connection for receiving or supplying multi-phase electrical power, the AC connection comprising first, second, and third AC terminals, and
   a three-level switching network comprising:
      a first set of switching devices coupled with the DC connection and the first AC terminal, the first set operable in one of three states to selectively electrically couple the first AC terminal to one of the first DC terminal, the second DC terminal, and the common node according to a first set of switching control signals,
      a second set of switching devices coupled with the DC connection and the second AC terminal, the second set operable in one of three states to selectively electrically couple the second AC terminal to one of the first DC terminal, the second DC terminal, and the common node according to a second set of switching control signals, and
      a third set of switching devices coupled with the DC connection and the third AC terminal, the third set operable in one of three states to selectively electrically couple the third AC terminal to one of the first DC terminal, the second DC terminal, and the common node according to a third set of switching control signals; and
   a switch control system providing the sets of switching control signals by space vector modulation to equalize the voltages across the capacitors in open-loop fashion during operation of the power conversion system;
   wherein the switch control system comprises an even-order harmonic elimination space vector modulation system coupled with the three-level switching network, the space vector modulation system providing the sets of switching control signals by space vector modulation according to an even-order harmonic elimination vector switching sequence ensuring half-wave symmetry at all times to balance the voltage at the common node.

2. The power conversion system of claim 1, wherein the space vector modulation system provides the sets of switching control signals according to the position of a reference vector in a space vector modulation diagram having 19 stationary space vectors that represent 27 switching states for the three-level switching network and defining six sectors positioned around an origin, the sectors each having six triangular segments, each segment defined by a unique set of three space vectors at the corners of the corresponding triangular segment;
   wherein the vector switching sequence provides for switching vector sequencing when the reference vector is in a given segment using switching states corresponding to the three space vectors defining the given segment; and
   wherein the vector switching sequence defines a sequence of switching states corresponding to the three space vectors defining each segment, with the vector switching sequences defined for diagram segments that are symmetrically opposite relative to the diagram origin providing for symmetrically opposite coupling of the AC terminals with the first and second DC terminals.

3. The power conversion system of claim 1, wherein the multi-phase AC connection is a three phase connection that receives or supplies three-phase electrical power.

4. The power conversion system of claim 1, wherein the three-level power conversion system is an inverter with the DC connection receiving DC electrical power, and wherein the three-level switching network provides the sets of switching control signals according to the even-order harmonic elimination vector switching sequence to provide multiphase AC electrical power at the AC connection.

5. The power conversion system of claim 1, wherein the three-level power conversion system is a rectifier with the AC connection receiving AC electrical power, and wherein the three-level switching network provides the sets of switching control signals according to the even-order harmonic elimination vector switching sequence to provide DC electrical power at the DC connection.

6. A space vector modulation control system for providing switching control signals to a three-level power conversion system having a DC connection with a pair of capacitors connected in series between first and second DC terminals and connected to one another at a common node, the control system comprising:
   driver means for selectively actuating individual switches or pairs of switches in a switching network of the power conversion system for selective coupling of individual AC terminals of the power conversion system to one of the first DC terminal, the second DC terminal, and the common node; and
   switch control means for controlling the driver means by space vector modulation to ensure half-wave symmetry at all times and to balance the voltages across the capacitors in open-loop operation of the power conversion system.

7. The control system of claim 6, wherein the switch control means comprises:
   an even-order harmonic elimination vector switching sequence; and
   processing means for controlling the driver means according to a reference vector and according to the vector switching sequence.

8. The control system of claim 7, wherein the processing means controls the driver means according to the position of the reference vector in a space vector modulation diagram having 19 stationary space vectors that represent 27 switching states for the three-level switching network and defining six sectors positioned around an origin, the sectors each having six triangular segments, each segment defined by a unique set of three space vectors at the corners of the corresponding triangular segment;
   wherein the vector switching sequence provides for switching vector sequencing when the reference vector is in a given segment using switching states corresponding to the three space vectors defining the given segment; and wherein the vector switching sequence defines a sequence of switching states corresponding to the three space vectors defining each segment, with the vector switching sequences defined for diagram segments that are symmetrically opposite relative to the diagram origin providing for symmetrically opposite coupling of AC terminals of the power conversion system with the first and second DC terminals.

9. The control system of claim 7, wherein the even-order harmonic elimination vector switching sequence comprises a machine readable medium having vector sequence listings for each segment of a space vector modulation diagram defining stationary space vectors representing switching states for the switching network and defining a plurality of sectors positioned around an origin of the space vector modulation diagram, the sectors each having a plurality of triangular segments, each segment defined by a unique set of three space vectors at the corners of the corresponding triangular segment, wherein the individual vector sequence listings define a sequence of switching states corresponding to the three space vectors defining each segment, with the vector switching sequences defined for diagram segments that are symmetrically opposite with respect to the diagram origin comprising symmetrically opposite switching states.

10. The control system of claim 9, wherein the vector sequence listings for each segment include three or more switching state entries, each entry indicating one of three possible switching state levels positive (P), zero (0), or negative (N) for each of three or more switching groups of a power conversion system, and wherein the vector sequence listings for each pair of first and second diagram segments that are diametrically opposite relative to the diagram origin comprise symmetrically opposite switching states, with positive (P) levels in the entries of the listing for the first segment corresponding to negative (N) levels in the entries of the listing for the second segment and vice versa.

11. The control system of claim 10, wherein the machine readable medium comprises vector sequence listings corresponding to six segments for each of six sectors defined by the space vector modulation diagram having 19 stationary space vectors that represent 27 switching states for the switching network.

12. The control system of claim 11, wherein the individual vector sequence listings for each segment include seven switching state entries.

13. A vector switching sequence for space vector modulation of a switching network in a three-level power conversion system, the vector switching sequence comprising:

a machine readable medium comprising vector sequence listings for each segment of a space vector modulation diagram defining stationary space vectors representing switching states for the switching network and defining a plurality of sectors positioned around an origin of the space vector modulation diagram, the sectors each having a plurality of triangular segments, each segment defined by a unique set of three space vectors at the corners of the corresponding triangular segment, wherein the individual vector sequence listings define a sequence of switching states corresponding to the three space vectors defining each segment, with the vector switching sequences defined for diagram segments that are symmetrically opposite with respect to the diagram origin comprising symmetrically opposite switching states to ensure half-wave symmetry at all times.

14. The vector switching sequence of claim 13, wherein the vector sequence listings for each segment include three or more switching state entries, each entry indicating one of three possible switching state levels positive (P), zero (0), or negative (N) for each of three or more switching groups of a power conversion system, and wherein the vector sequence listings for each pair of first and second diagram segments that are diametrically opposite relative to the diagram origin comprise symmetrically opposite switching states, with positive (P) levels in the entries of the listing for the first segment corresponding to negative (N) levels in the entries of the listing for the second segment and vice versa.

15. The vector switching sequence of claim 14, wherein the machine readable medium comprises vector sequence listings corresponding to six segments for each of six sectors defined by the space vector modulation diagram having 19 stationary space vectors that represent 27 switching states for the switching network.

16. The vector switching sequence of claim 15, wherein the individual vector sequence listings for each segment include seven switching state entries.

17. The vector switching sequence of claim 14, wherein the individual vector sequence listings for each segment include seven switching state entries.

18. A method for space vector modulation control of a three-level power conversion system, the method comprising:

providing a space vector modulation vector switching sequence comprising vector sequence listings for each segment of the space vector modulation diagram, the individual vector sequence listings defining a sequence of switching states corresponding to the three space vectors defining each segment, wherein the vector switching sequences defined for diagram segments that are symmetrically opposite with respect to the diagram origin comprise symmetrically opposite switching states;

obtaining a reference vector representative of a desired state of the power conversion system;

determining a reference vector segment location in a space vector modulation diagram defining space vectors representing switching states for the switching network and defining a plurality of sectors positioned around an origin of the space vector modulation diagram, the sectors each having a plurality of triangular segments, each segment defined by a unique set of three space vectors at the corners of the corresponding triangular segment; and providing switching control signals to the power conversion system to ensure half-wave symmetry at all times according to the vector sequence listing for the reference vector segment location.

19. The method of claim 18, wherein providing the switching control signals according to the vector sequence listing for the reference vector segment location comprises:

computing switching times for application of the individual switching states of the vector sequence list based on the reference vector segment location; and applying the switching states of the vector sequence list to control the power conversion system according to the computed switching times.

* * * * *